US012209207B2

(12) United States Patent
Chen et al.

(10) Patent No.: US 12,209,207 B2
(45) Date of Patent: Jan. 28, 2025

(54) TRANSPARENT, ANTI-FOG TAPE OR FILM AND RELATED DEVICES AND METHODS

(71) Applicant: Massachusetts Institute of Technology, Cambridge, MA (US)

(72) Inventors: Gang Chen, Cambridge, MA (US); Xuanhe Zhao, Allston, MA (US); Shaoting Lin, Cambridge, MA (US); Yoichiro Tsurimaki, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 219 days.

(21) Appl. No.: 17/833,101

(22) Filed: Jun. 6, 2022

(65) Prior Publication Data

US 2022/0403220 A1    Dec. 22, 2022

Related U.S. Application Data

(60) Provisional application No. 63/197,294, filed on Jun. 4, 2021.

(51) Int. Cl.
*C09J 183/06*  (2006.01)
*C09J 7/24*    (2018.01)
*C09J 7/30*    (2018.01)

(52) U.S. Cl.
CPC .......... *C09J 183/06* (2013.01); *C09J 7/243* (2018.01); *C09J 7/30* (2018.01); *C09J 2301/122* (2020.08);
(Continued)

(58) Field of Classification Search
CPC ... C09J 183/06; C09J 7/243; C09J 7/30; C09J 2301/122; C09J 2301/16; C09J 2451/00
(Continued)

(56) References Cited

U.S. PATENT DOCUMENTS

| 4,555,441 A * | 11/1985 | Rothenberg | ......... D06N 7/0002 |
| | | | 156/271 |
| 5,451,450 A * | 9/1995 | Erderly | ...................... C08J 5/18 |
| | | | 264/293 |

(Continued)

OTHER PUBLICATIONS

Tang Z. et al., Machine translation to English of CN107353760A by Clarivate Analytics, with full foreign patent attached, Nov. 17, 2017. (Year: 2017).*

(Continued)

*Primary Examiner* — S. Behrooz Ghorishi
*Assistant Examiner* — Gregory C. Grosso
(74) *Attorney, Agent, or Firm* — Barnes & Thornburg LLP

(57) ABSTRACT

The present disclosure generally relates to a stretchable anti-fogging tape (SAT) that can be applied to diverse transparent materials with varied curvatures for persistent fogging prevention. The SAT comprises three synergistically-combined transparent layers: i) a stretchable middle layer with high elastic recovery to keep transparent materials tightly bound; ii) an anti-fogging top layer to impart hydrophilicity to transparent materials; and iii) an adhesive bottom layer to form robust yet reversible adhesion between transparent materials and SATs. The SAT can be configured to have water condensate form a predominantly continuous film thereon in response to a high humidity environment At least two applications are demonstrated, including the SAT-adhered eyeglasses and goggles for clear fog-free vision, and the SAT-adhered condensation cover for efficient solar-powered freshwater production.

20 Claims, 16 Drawing Sheets

(52) U.S. Cl.
CPC ........ *C09J 2301/16* (2020.08); *C09J 2451/00* (2013.01)

(58) Field of Classification Search
USPC ....................................................... 156/329
See application file for complete search history.

(56) References Cited

U.S. PATENT DOCUMENTS

| | | | |
|---|---|---|---|
| 5,471,036 | A | 11/1995 | Sperbeck |
| 6,394,613 | B1 | 5/2002 | Hatakeyama et al. |
| 9,150,766 | B2 | 10/2015 | Phang |
| 2014/0123578 | A1* | 5/2014 | Ingber ............ F24S 10/50 52/173.1 |
| 2014/0208978 | A1 | 7/2014 | Sunder et al. |
| 2014/0377566 | A1* | 12/2014 | Majumdar ............ G02B 1/14 428/424.6 |
| 2015/0060431 | A1 | 3/2015 | Yang et al. |
| 2017/0342249 | A1* | 11/2017 | Zhao ............ C08L 23/14 |

OTHER PUBLICATIONS

Wagner, M. et al., "Nonlinear Shear Creep and Constrained Elastic Recovery of a LDPE Melt", Rheologica Acta, vol. 17, No. 2, pp. 138-148, (1978). (Year: 1978).*

Tang Z. et al., Machine translation to English of CN107353760A by Clarivate Analytics, with full foreign patent attached, Nov. 17, 2017. See NPL Document Filed on May 21, 2024. (Year: 2017).*

Wagner, M. et al., "Nonlinear Shear Creep and Constrained Elastic Recovery of a LDPE Melt", Rheologica Acta, vol. 17, No. 2, pp. 138-148, (1978). See NPL Document Filed on May 21, 2024. (Year: 1978).*

San-Juan et al., "Assessment of efficiency of windscreen demisting systems in electrical vehicles by using IR thermography," Applied Thermal Engineering 104, 479-485 (2016).

Segelstein, D. J., "The complex refractive index of water," University of Missouri—Kansas City, (1981).

Shang, Q. & Zhou, Y. Fabrication of transparent superhydrophobic porous silica coating for self-cleaning and anti-fogging. Ceramics International 42, 8706-8712 (2016).

Siddiqa, A. J., Chaudhury, K. & Adhikari, B. Hydrophilic low density polyethylene (LDPE) films for cell adhesion and proliferation. Res. Rev. J. Med. Chem 1, 43-54 (2015).

Sun, Z., et al., Fly-eye inspired superhydrophobic anti-fogging inorganic nanostructures. Small, 2014. 10(15): p. 3001-3006.

Syafiq. A. et al. Facile synthesize of transparent hydrophobic nano-CaCO3 based coatings for self-cleaning and anti-fogging. Materials Chemistry and Physics 239, 121913 (2020).

Tao, P., Ni, G., Song, C., Shang, W., Wu, J., Zhu, J., Chen, G. & Deng, T. Solar-driven interfacial evaporation. Nature energy 3, 1031-1041 (2018).

Tretinnikov et al., "Benzophenone-initiated grafting photopolymerization of acrylic acid on the surface of polyethylene from the monomer aqueous solution without its deaeration," Polymer Science Series B 54, 427-433 (2012).

Wei et al., "Fabrication and characterization of polyglycerol fatty acid esters/polyethylene antifogging film," Journal of Food Process Engineering 40, e12420 (2017).

Wu et al., "Swell-induced surface instability of hydrogel layers with material properties varying in thickness direction," Int. J. Solids Struct. 2013, 50, 578.

Xu et al., "Nanostructured polymer films with metal-like thermal conductivity," Nature communications 10, 1-8 (2019).

Xu et al., "Molecular engineered conjugated polymer with high thermal conductivity," Science advances 4, eaar3031 (2018).

Yao et al., "Broadband antireflective superhydrophilic thin films with outstanding mechanical stability on glass substrates," Chinese Journal of Chemistry 32, 507-512 (2014).

Yao et al., "Emergency tracheal intubation in 202 patients with COVID-19 in Wuhan, China: lessons learnt and international expert recommendations,'"Br. J. Anaesth. 2020, 125, e28,".

Yu et al., "Multifunctional "hydrogel skins" on diverse polymers with arbitrary shapes," Advanced Materials 31, 1807101 (2019).

Yuk et al., "Tough bonding of hydrogels to diverse non-porous surfaces," Nature materials 15, 190-196 (2016).

Yuk et al., "Skin-inspired hydrogel-elastomer hybrids with robust interfaces and functional microstructures," Nature communications 7, 1-11 (2016).

Zhao, "Multi-scale multi-mechanism design of tough hydrogels: building dissipation into stretchy networks," Soft matter 10, 672-687 (2014).

Zhao, F. et al., "Highly efficient solar vapour generation via hierarchically nanostructured gels," Nature nanotechnology 13, 489-495 (2018).

Zhao et al., "Materials for solar-powered water evaporation," Nature Reviews Materials, 1-14 (2020).

Zhang, Y., Gauthier, L., De Halleux, D., Dansereau, B. & Gosselin, A. Effect of covering materials on energy consumption and greenhouse microclimate. Agricultural and Forest Meteorology 82, 227-244 (1996).

Zhou et al., "Architecting highly hydratable polymer networks to tune the water state for solar water purification," Science advances 5, eaaw5484 (2019).

Anderson et al., "The effect of Brij@ surfactants in sol-gel processing for the production of TiO2 thin films," Polyhedron 85, 83-92 (2015).

Ashby et al., "Materials selection in mechanical design," Le Journal de Physique IV 3, C7-1-C7-9 (1993).

Briscoe et al., "The effect of surface fog on the transmittance of light," Solar Energy 46, 191-197 (1991).

Cao, M. et al., "Water-repellent properties of superhydrophobic and lubricant-infused "slippery" surfaces: A brief study on the functions and applications," ACS applied materials & interfaces 8, 3615-3623 (2016).

Chen et al., "Transparent Superhydrophobic/Superhydrophilic Coatings for Self-Cleaning and Anti-Fogging," Appl. Phys. Lett. 2012, 101, 033701.

Crebolder et al., "Determining the effects of eyewear fogging on visual task performance," Applied ergonomics 35, 371-381 (2004).

Cui et al., "Mechanical properties of end-linked PEG/PDMS hydrogels," Macromolecules 45, 6104-6110 (2012).

Dain et al., "Assessment of fogging resistance of anti-fog personal eye protection," Ophthalmic and Physiological Optics 19, 357-361 (1999).

Dal Kim et al., "Poly (amide-imide) materials for transparent and flexible displays," Science advances 4, eaau1956 (2018).

Dong, H., et al., Superhydrophilic surfaces via polymer—SiO2 nanocomposites. Langmuir, 2010. 26(19): p. 15567-15573.

Duran et al., "Current trends, challenges, and perspectives of anti-fogging technology: Surface and material design, fabrication strategies, and beyond," Progress in Materials Science 99, 106-186 (2019).

Durán et al., "Water drop-surface interactions as the basis for the design of anti-fogging surfaces: theory, practice, and applications trends," Advances in colloid and interface science 263, 68-94 (2019).

Edition, F. Guidelines for drinking-water quality. WHO chronicle 38, 104-108 (2011).

Eshaghi et al., "Fabrication of antireflective antifogging nanoporous silica thin film on glass substrate by layer-by-layer assembly method," Journal of non-crystalline solids 405, 148-152 (2014).

Fu et al., "Surface modification of linear low-density polyethylene film by amphiphilic graft copolymers based on poly (higher α-olefin)-graft-poly (ethylene glycol)," Journal of Applied Polymer Science 119, 1111-1121 (2011).

Gao, X., et al., "The dry-style antifogging properties of mosquito compound eyes and artificial analogues prepared by soft lithography," Advanced Materials, 2007. 19(17): p. 2213-2217.

Ghasemi et al., "Solar steam generation by heat localization," Nature communications 5, 4449 (2014).

(56) References Cited

OTHER PUBLICATIONS

Han et al., "Flourishing Bioinspired Antifogging Materials with Superwettability: Progresses and Challenges," Ren, Adv. Mater. 2018, 30, 1704652.
Hu, X. et al., "Highly transparent superhydrophilic graphene oxide coating for antifogging," Materials Letters 182, 372-375 (2016).
Huang, H. Ghasemi, Adv. Colloid Interface Sci. 2020, 102264.
Introzzi, L. et al. "Wetting enhancer" pullulan coating for antifog packaging applications. ACS applied materials & interfaces 4, 3692-3700 (2012).
Irusta et al., "Migration of antifog additives in agricultural films of low-density polyethylene and ethylene-vinyl acetate copolymers," Journal of Applied Polymer Science 111, 2299-2307 (2009).
Kim et al., "Study of photo-induced hydrophilicity and self-cleaning property of glass surfaces immobilized with TiO2 nanoparticles using catechol chemistry," Surface and Coatings Technology 294, 75-82 (2016).
Lai et al., "Transparent superhydrophobic/superhydrophilic TiO 2-based coatings for self-cleaning and anti-fogging," Journal of Materials Chemistry 22, 7420-7426 (2012).
Lamnatou et al., "Solar radiation manipulations and their role in greenhouse claddings: Fluorescent solar concentrators, photoselective and other materials," Renewable and Sustainable Energy Reviews 27, 175-190 (2013).
Lee et al., "Zwitter-wettability and antifogging coatings with frost-resisting capabilities," ACS nano, 2013. 7(3): p. 2172-2185.
Li et al., "Multi-functional coating of cellulose nanocrystals for flexible packaging applications," Cellulose 20, 2491-2504 (2013).
Li, W. et al., "Transparent Surfactant/Epoxy Composite Coatings with Self-Healing and Superhydrophilic Properties," Macromolecular Materials and Engineering 304, 1800765 (2019).
Lin et al., "Anti-fatigue-fracture hydrogels," Science advances 5, eaau8528 (2019).
Lin et al., Muscle-like fatigue-resistant hydrogels by mechanical training. Proceedings of the National Academy of Sciences 116, 10244-10249 (2019).
Liu, J. et al., "Fatigue-resistant adhesion of hydrogels," Nature communications 11, 1-9 (2020).
Liu, M., S. Wang, and L. Jiang, Nature-inspired superwettability systems. Nature Reviews Materials, 2017. 2(7): p. 1-17.
Liu, X., Liu, J., Lin, S. & Zhao, X. Hydrogel machines. Materials Today (2020).
Liu, Z. et al., "Extremely cost-effective and efficient solar vapor generation under nonconcentrated illumination using thermally isolated black paper," Global Challenges 1, 1600003 (2017).
Lozano, L. M. et al., "Optical engineering of polymer materials and composites for simultaneous color and thermal management," Optical Materials Express 9, 1990-2005 (2019).
Madan et al., "Fogging of goggles in PPE during COVID-19 pandemic," A practical problem with multiple possible solutions. Advances in Respiratory Medicine (2020).
Margrain, T. H. & Owen, C. The misting characteristics of spectacle lenses. Ophthalmic and Physiological Optics 16, 108-114 (1996).
Miljkovic et al., "Effect of Droplet Morphology on Growth Dynamics and Heat Transfer during Condensation on Superhydrophobic Nanostructured Surfaces," ACS nano 2012, 6, 1776.
Molina et al., "Ureasil-polyether hybrid blend with tuneable hydrophilic/hydrophobic features based on U-PEO1900 and U-PPO400 mixtures," Journal of sol-gel science and technology 70, 317-328 (2014).
Ni et al., "Steam generation under one sun enabled by a floating structure with thermal concentration," Nature Energy 1, 1-7 (2016).
Ni, et al., "A salt-rejecting floating solar still for low-cost desalination," Energy & Environmental Science 11, 1510-1519 (2018).
Nilsson et al., "A solar reflecting material for radiative cooling applications: ZnS pigmented polyethylene," Solar Energy materials and Solar cells 28, 175-193 (1992).
Nuraje et al., "Durable antifog films from layer-by-layer molecularly blended hydrophilic polysaccharides," Langmuir 27, 782-791 (2011).
Oh et al., Adv. Funct. Mater. 2018, 28, 1707000.
Ohdaira, et al., "Antifogging effects of a socket-type device with the superhydrophilic, titanium dioxide-coated glass for the laparoscope," Surgical endoscopy 21, 333-338 (2007).
Palik, E. D. Handbook of optical constants of solids. vol. 3 (Academic press, 1998).
Park, K.-C et al., "Nanotextured silica surfaces with robust superhydrophobicity and omnidirectional broadband supertransmissivity," ACS nano 6, 3789-3799 (2012).
Ren et al., "Recent progress in synthesis of antifogging agents and their application to agricultural films: a review," Journal of Coatings Technology and Research 15, 445-455 (2018).
Sánchez-Valdes et al., "Polyethylene grafted maleic anhydride to improve wettability of liquid on polyethylene films," Journal of applied polymer science 79, 1802-1808 (2001).

\* cited by examiner

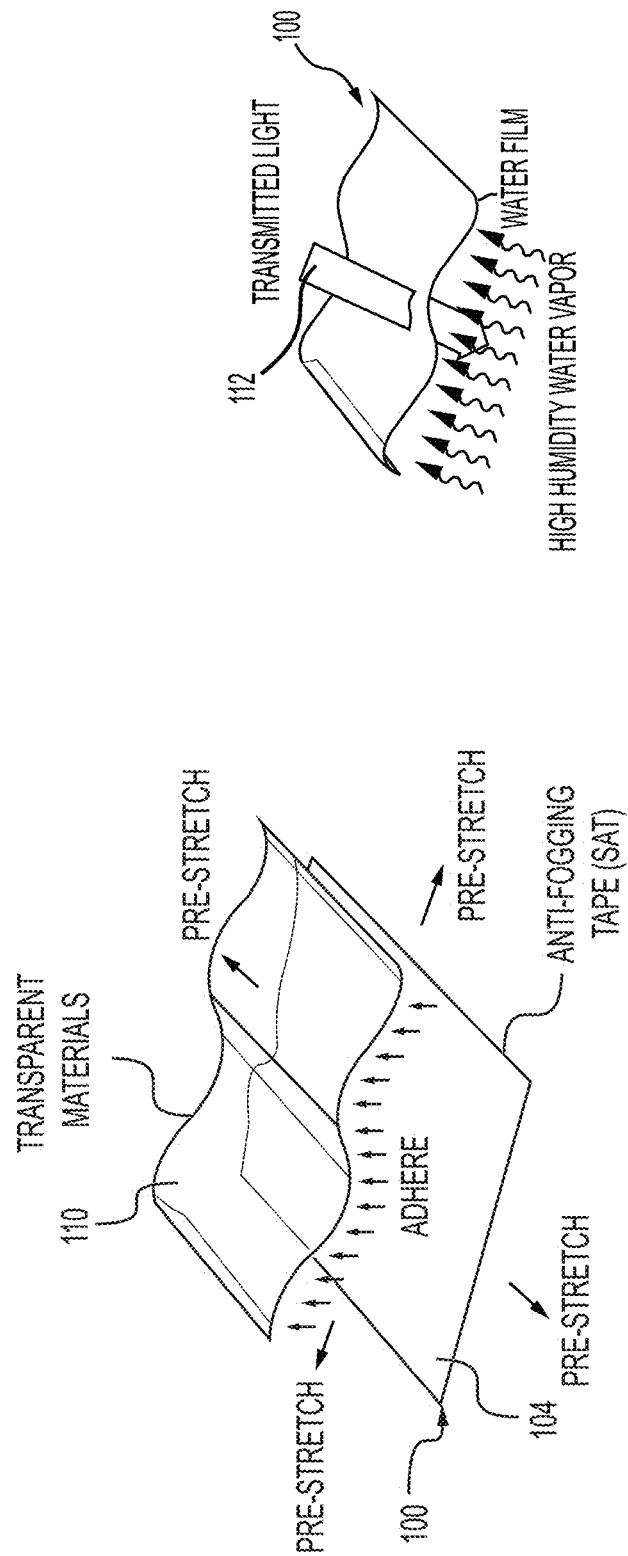

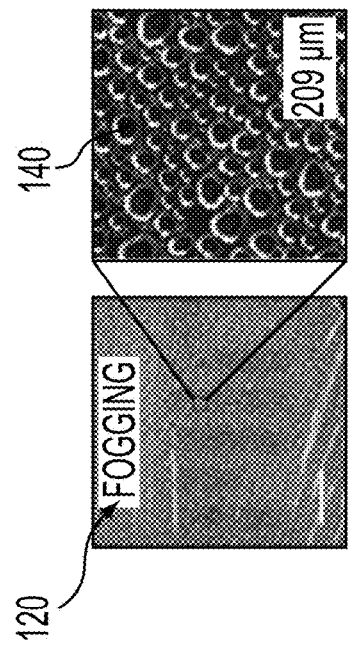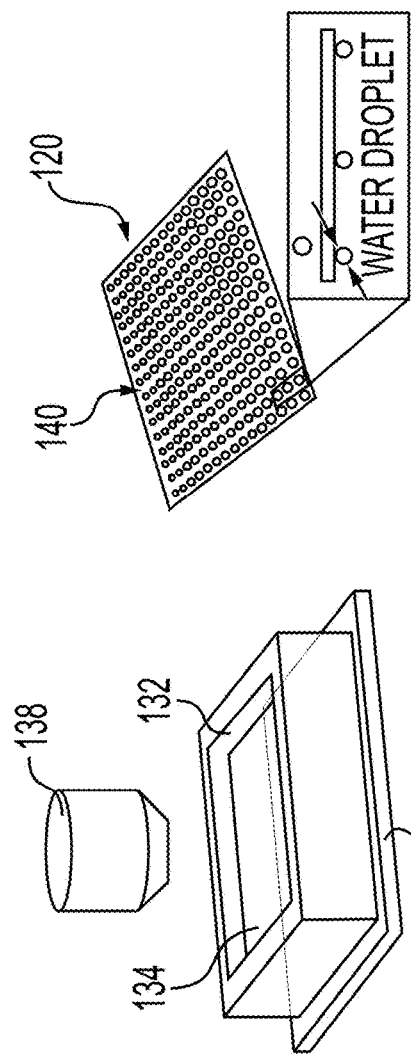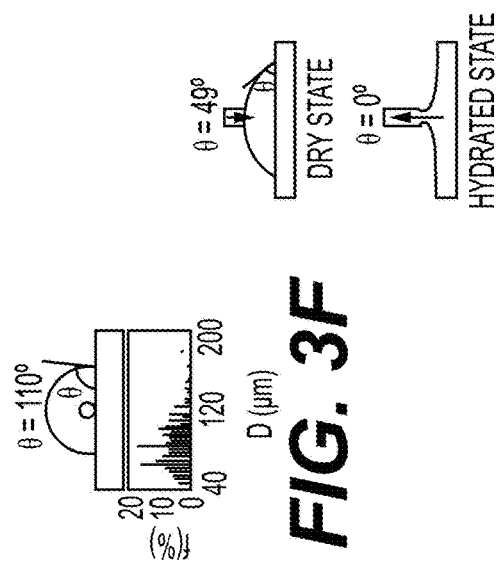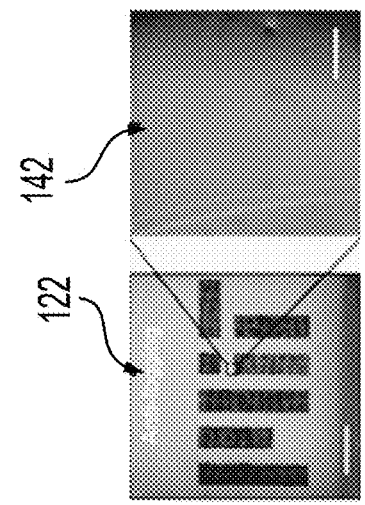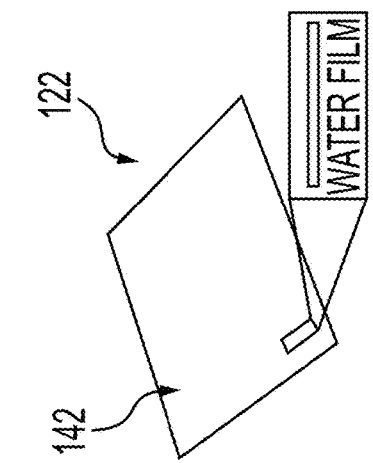
FIG. 3A  FIG. 3B  FIG. 3C  FIG. 3D  FIG. 3E  FIG. 3F  FIG. 3G

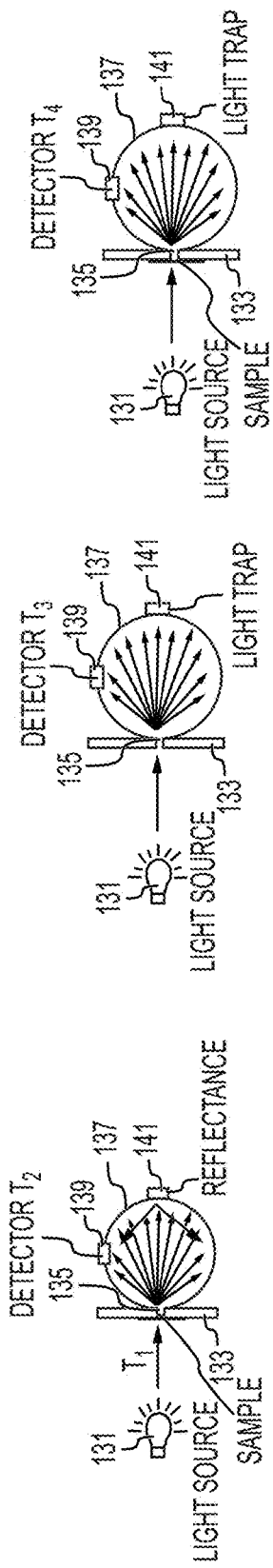
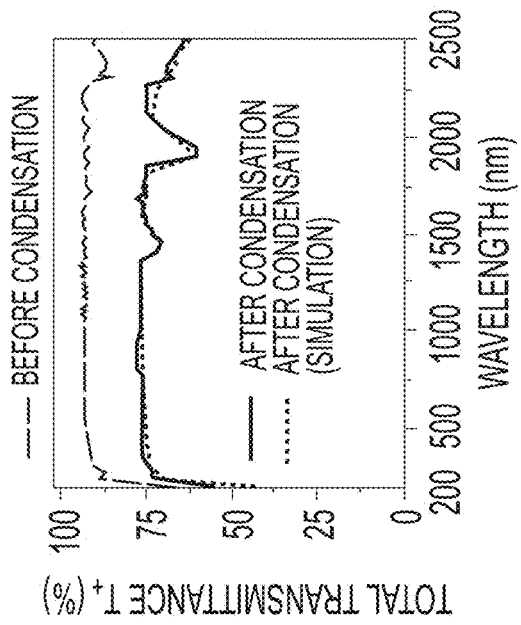
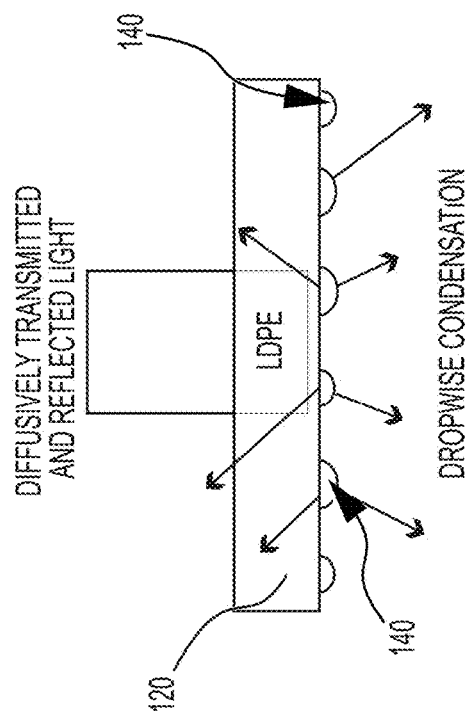
FIG. 4A
FIG. 4B
FIG. 4C
FIG. 4D

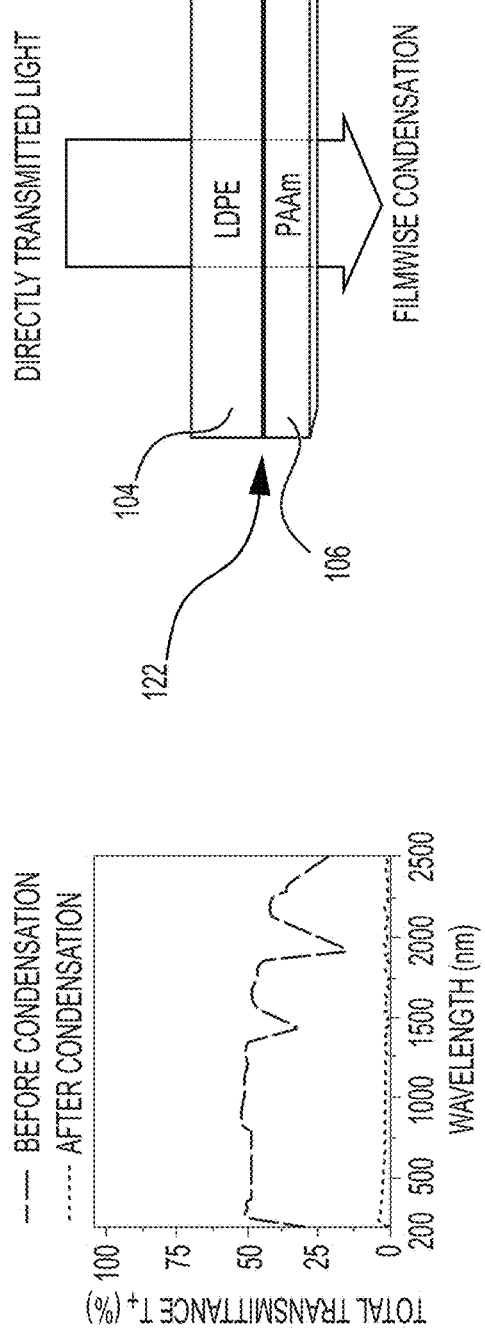
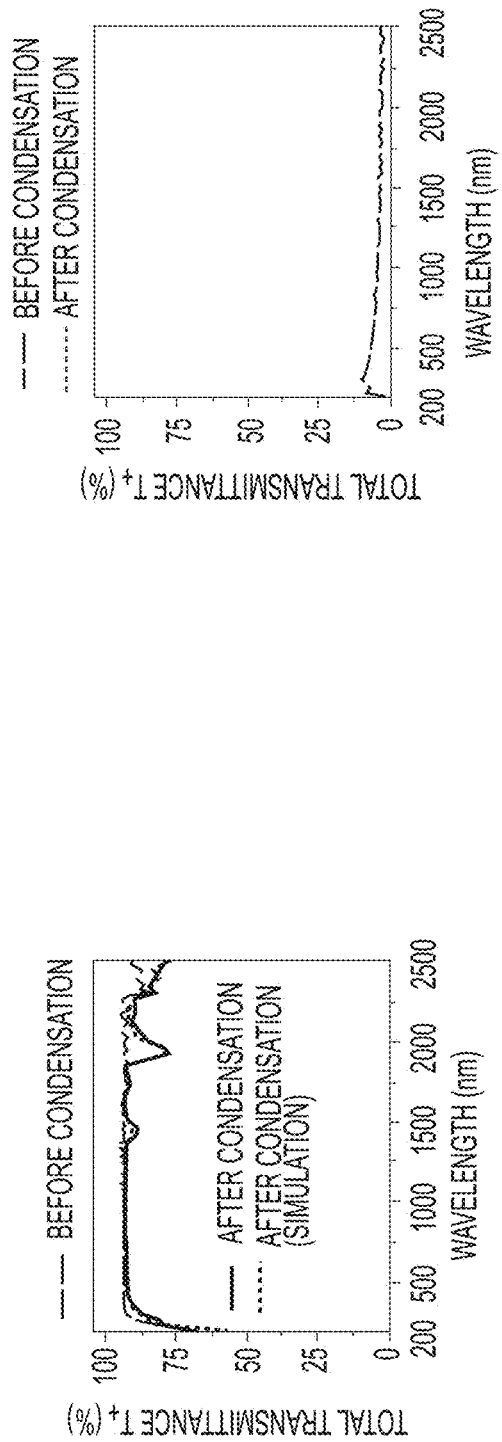

TRANSPARENT, ANTI-FOG TAPE OR FILM AND RELATED DEVICES AND METHODS

CROSS REFERENCE TO RELATED APPLICATION

The present disclosure claims priority to and the benefit of U.S. Provisional Application No. 63/197,294, entitled "Transparent, Anti-Fog Tape or Film and Related Devices and Methods," filed on Jun. 4, 2021, the content of which is incorporated by reference herein in its entirety.

FIELD

The present disclosure relates to formulated materials designed to resist fog and remain transparent, and more particularly relates to stretchable, anti-fogging tapes or films that can be used in conjunction with objects such as optical devices (e.g., glasses, goggles), solar-powered devices (e.g., solar stills, solar cells), and other objects (e.g., mirrors, car windows) intended to be transparent (e.g. greenhouse glass) to maintain high total transmittance and low diffuse transmittance under a variety of conditions that typically cause fogging and the like.

BACKGROUND

Transparent materials allowing light to pass them through without appreciable light scattering are indispensable for a wide range of applications ranging from protective personnel equipment and optical instruments to solar-powered devices. When exposed to high-humidity environments or sudden change of temperature, surface fogging on transparent materials causes unintended light scattering, followed by decreased visibility of optical devices, lowered energy-conversion efficiency of solar stills and solar cells, and reduced crop yield in greenhouses. Fogging on glasses also induces annoyance in daily life, and especially triggers health risks in fighting diseases like COVID-19 as fogging increases the frequency of hand-face touching.

Surface fogging is caused by droplet condensation on the surface which scatters light, and it can be avoided by facilitating filmwise condensation through surface wetting. One way is to spray hydrophilic agents onto the surface, but it suffers from a short lifespan, e.g., less than a few days, due, at least in part, to the weak interaction between the hydrophilic agents and the surface. Micro- and nano-fabrication are also used to engineer surface topology for modifying surface hydrophobicity, but their manufacturing processes are technically complicated and time-consuming, thereby limited to laboratory research and impractical for large-scale massive production. Whereas strong anchorage of crosslinked hydrogels to transparent materials has been developed to prevent surface fogging, it usually leads to the reduced transparency in high-humidity environments due to the swelling-induced mechanical instabilities of hydrogels. Additionally, the abovementioned anti-fogging methods are usually selective to a certain specific transparent material. For example, the method of covalently anchoring hydrophilic polysaccharides to glass cannot be applied to polyethylene films due to the different interfacial chemistry. The challenges associated with existing anti-fogging methods are further amplified when transparent materials are curved (as in eyeglasses) and/or experience large deformations (as in stretch wraps).

Thus, a universal strategy to maintain anti-fogging performance of transparent materials in humid and dynamic environments for a prolonged period of time remains a prevailing challenge.

SUMMARY

The present disclosure provides for a stretchable anti-fogging tape or film that can be adhered to versatile transparent materials with various curvatures for persistent fogging prevention, enabling new applications including fog-free eyeglasses, protective goggles, efficient solar-powered freshwater production, and greenhouse glass, to name a few non-limiting applications. The tapes or films, and related techniques, can be applied in the new production of devices, such as newly manufactured eyewear, solar devices, greenhouse glass, etc., and/or can be applied retroactively to existing objects intended to be and remain transparent. More particularly, a universal anti-fogging strategy is provided that is based on a stretchable anti-fogging tape (SAT) or film that can be adhered to a wide range of transparent materials with various curvatures for persistent fogging prevention.

One exemplary embodiment of an anti-fog tape that is configured to be applied to a transparent object includes a first hydrophilic layer, a second, stretchable layer, and a third, adhesive layer. The first, hydrophilic layer is configured to have water condensate form a predominantly continuous film thereon in response to a high humidity environment. The second, stretchable layer includes an elastic recovery of at least about 0.50, with the second, stretchable layer being covalently crosslinked with the first, hydrophilic layer. A diffuse transmittance of the anti-fog tape is approximately 5% or less in high-humidity environments.

The anti-fog tape can be devoid of each of an anti-fog spray, and one or more hydrophilic spray agents. The high-humidity environments can include an environment in which humidity increases approximately in the range from about 30% to about 100% or an environment in which humidity decreases approximately in the range from about 100% to about 30%.

The anti-fog tape can further include a backing layer in contact with the third, adhesive layer. The first, hydrophilic layer can be in a swollen state. In some embodiments, the first, hydrophilic layer can include uncrosslinked hydrophilic polymers. The uncrosslinked hydrophilic polymers of the first, hydrophilic layer can include uncrosslinked polyacrylamide that is covalently grafted to the first layer. The uncrosslinked hydrophilic polymers can provide the covalent crosslink between the second, stretchable layer and the first, hydrophilic layer.

The second, stretchable layer can include a low-density polyethylene. In some embodiments, a receding contact angle of the second, stretchable layer can be approximately about 0°. The third, adhesive layer can be configured to be reversibly adhesive. In some embodiments, the third, adhesive layer can include crosslinked polydimethylsiloxane.

In some embodiments, the diffuse transmittance of approximately 5% or less can be maintained under at least one of uniaxial tension, punching, or cyclic scratching. A total transmittance of the anti-fog tape can be approximately at least 80%. The total transmittance of approximately at least 80% can be maintained under at least one of uniaxial tension, punching, or cyclic scratching. In some embodiments, the total transmittance of approximately at least 80% and the diffuse transmittance of approximately 5% or less can be maintained for at least one of: at least 50 days, at least 75 days, at least 100 days, at least 125 days, at least 150 days, or at least 175 days.

Exemplary embodiments of an object having the anti-fog tape of the present embodiments coupled thereto can include at least one of a mirror, glass, polyethylene, polyethylene terephthalate, polystyrene, poly(methyl methacrylate), or polydimethylsiloxane. The object can be a flat object or a curved objected. In some embodiments, the object can include at least one of eyeglasses or goggles. In some embodiments, the object includes at least one of a solar cell or a solar still. The object can include at least one greenhouse glass panel.

One exemplary method of applying an anti-fog tape to a transparent object includes pre-stretching an anti-fog tape to remove wrinkles from a surface thereof and adhering the anti-fog tape to one or more transparent surfaces of a transparent object. A resulting total transmittance for the one or more transparent surfaces having the anti-fog tape adhered to it is approximately at least 80% and a diffuse transmittance for the one or more transparent surfaces having the anti-fog tape adhered to it is approximately 5% or less in high-humidity environments.

In some embodiments, the transparent object can include at least one of glass, polyethylene, polyethylene terephthalate, polystyrene, poly(methyl methacrylate), or polydimethylsiloxane. The object can include a flat surface or a curved surface. In some embodiments, the object can include at least one of eyeglasses or goggles. The object can include at least one of a solar cell or a solar still. In some embodiments, the object can include at least one greenhouse glass panel.

BRIEF DESCRIPTION OF THE DRAWINGS

This disclosure will be more fully understood from the following description taken in conjunction with the accompanying drawings, in which:

FIG. 1C is a schematic perspective view of one embodiment of a working principle for applying the SAT showing the SAT being pre-stretched after peeling from the backing layer;

FIG. 1D is a schematic perspective view of the SAT of FIG. 1C exposed to a high-humidity environment and allowing light to transmit therethrough;

FIG. 3A is a schematic perspective view of an experimental setup to characterize condensed water on films;

FIG. 3B is a schematic perspective view of dropwise condensation on the pristine LDPE film of FIG. 2A;

FIG. 3C is an optical image of dropwise condensation on the pristine LDPE film of FIG. 3B;

FIG. 3D is a schematic perspective view of filmwise condensation on the LDPE-PAAm film of FIG. 2B;

FIG. 3E is an optical image of filmwise condensation on the LDPE-PAAm film of FIG. 3D;

FIG. 3F is a schematic side view of a measured water contact angle on the pristine LDPE film of FIG. 3B and a corresponding histogram of the size distribution of water droplets;

FIG. 3G is a schematic side view of measured water contact angle on the pristine LDPE film of FIG. 3B in a dry state and a hydrated state;

FIG. 4A is a schematic side view of a measurement of total transmittance $T_t=T_2/T_1$, where $T_1$ is the intensity of incident light and $T_2$ is the intensity of transmitted light in total;

FIG. 4B is a schematic side view of the measurement of diffuse transmittance $T_d=[T_4-T_3(T_2/T_1)]/T_1$, where $T_3$ is the intensity of the scattered light by the instrument measured with no sample in position but with the light trap in position, $T_4$ is the intensity of the diffusively transmitted light with both the sample and the light trap in position;

FIG. 4C is a schematic side view of the diffusively transmitted and reflected light by the pristine LDPE film of FIG. 2A;

FIG. 4D is a graph of a measured total transmittance of the pristine LDPE film of FIG. 4C before condensation and after condensation when exposed to hot water vapor;

FIG. 4E is a graph of a measured diffuse transmittance of the pristine LDPE film of FIG. 4C before condensation and after condensation when exposed to hot water vapor;

FIG. 4F is a schematic side view of the directly transmitted light through the LDPE-PAAm film of FIG. 3D;

FIG. 4G is a schematic illustration of a measured total transmittance of the LDPE-PAAm film of FIG. 4F before condensation and after condensation when exposed to hot water vapor;

FIG. 4H is a measured diffuse transmittance of the LDPE-PAAm film of FIG. 4F before condensation and after condensation when exposed to hot water vapor;

DESCRIPTION

Figures 1A, 1B:
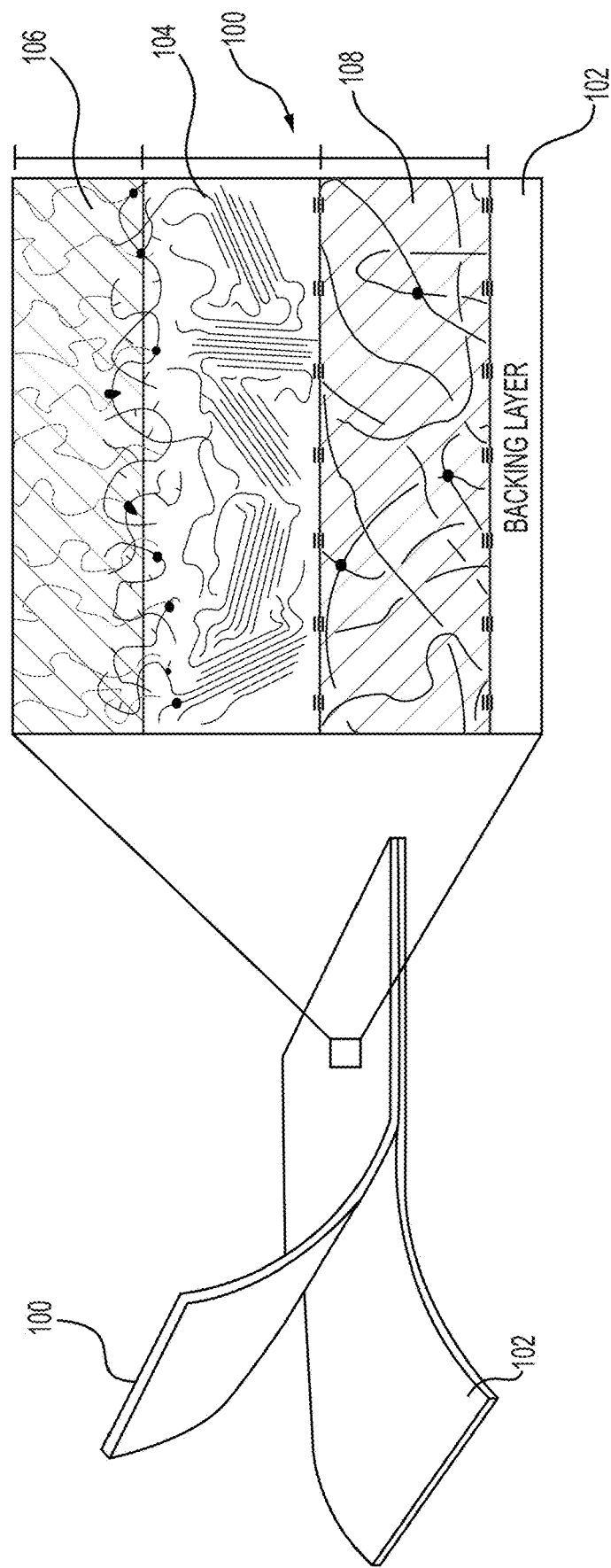
FIG. 1A is a schematic perspective view of one embodiment of a stretchable anti-fogging tape (SAT) being attached, and peeled from, a backing.
FIG. 1B is a schematic top view of the three layers that make up the SAT of FIG. 1A.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, compositions, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Like-numbered components across embodiments generally have similar features unless otherwise stated or a person skilled in the art would appreciate differences based on the present disclosure and/or his/her knowledge. Accordingly, aspects and features of every embodiment may not be described with respect to each embodiment, but those aspects and features are applicable to the various embodiments unless statements or understandings are to the contrary.

Further, to the extent features, layers, sides, objects, steps, or the like are described as being "first," "second," third," etc., and/or "lower," "upper," "middle," etc., such numerical and/or location ordering/identification is generally arbitrary, and thus such numbering can be interchangeable unless indicated or otherwise understood by those skilled in the art to not be interchangeable (e.g., an adhesive layer in a three-layer tape configuration is not typically a middle or intermediate layer because the adhesive layer is used to attach the tape to an object). Similarly, consecutive ordering of terms, such as "first," "second," and "third," such as with respect to layers, does not necessarily imply that there cannot be additional layers in between the consecutively ordered layers. In other words, a "first layer" does not necessarily have to be directly adjacent to a "second layer." There can be one or more additional layers between those two layers. Terms commonly known to those skilled in the art may be used interchangeably herein. Still further, to the extent particular materials, dimensions, parameters, times, temperatures, manufacturing techniques, etc. are used in conjunction with one or more of the present disclosures and/or described tests, a person skilled in the art will appreciate often such uses are non-limiting examples, and the skilled person will understand other materials, dimensions, parameters, etc. that can be used, in view of the present disclosure, without departing from the spirit of the present disclosure. Still further, the present disclosure includes some illustrations, descriptions, and examples that include prototypes, schematic illustrations, testing designs, and/or bench models. A person skilled in the art will recognize how to rely upon the present disclosure to integrate or otherwise turn the systems, devices, techniques, and methods provided for herein into a commercial product, optical device, solar-powered device, personal protective equipment, etc.

Motivated by the ubiquitous fogging and their threatening effects on environment and human health, the present disclosure provides for a universal anti-fogging approach enabled by the design of a stretchable anti-fogging tape (SAT) that can be generally applicable to diverse transparent materials and various curved surfaces, including but not limited to for use with optical devices and solar products. The present disclosures demonstrate tapes (i.e., the SAT), films, and resulting objects that have superior anti-fogging properties with high total transmittance above approximately 80% and low diffuse transmittance below approximately 5% in high-humidity environments, under various modes of mechanical deformations (e.g., uniaxial tension, punching, and cyclic mopping), and over a prolonged lifetime (over at least 193 days as tested so far). A variety of potential applications of the SAT are provided, including for efficient solar stills and personal protective equipment. This disclosure also suggests new applications of hydrogels towards functional flexible transparent materials by harnessing tailored properties of polyethylene films and hydrogels.

FIGS. 1A-1D illustrate a stretchable anti-fogging tape (SAT) 100 of the present embodiments. The SAT 100 can be applied to a variety of transparent materials with various curvatures. As shown, the SAT 100 can be adhered to a backing layer 102 that can be readily peeled from the backing layer 102 to expose the SAT. The backing layer 102 can be made from polyethylene terephthalate (SAT) or another material that readily allows for separation when a manual force is applied thereto.

FIG. 1B illustrates the layers that make up the SAT 100 in greater detail. As shown, the SAT 100 can include a series of layers stacked on one another to form the tape. For example, the SAT 100 can include three synergistically-combined transparent layers: i) a stretchable middle layer 104 with high elastic recovery made of, by way of example, low-density polyethylene (LDPE) to keep transparent materials tightly bound; ii) an anti-fogging top layer 106 made of, by way of example, uncrosslinked polyacrylamide (PAAm) to impart hydrophilicity to transparent materials; and iii) an adhesive bottom layer 108 made of, by way of example, loosely crosslinked polydimethylsiloxane (PDMS) to form robust yet reversible adhesion between transparent materials and SATs. The function of each layer for imparting anti-fogging properties onto the tapes are discussed below in greater detail.

A person skilled in the art will recognize that the SAT 100 can have one or more additional layers added thereto. The additional layers can adjust a total transmittance of light through the SAT, filter wavelengths of light through the SAT, and so forth. For example, in some embodiments, the additional layer of the SAT 100 can include a layer of polyacrylic acid (PAA) and/or Poly (N-isopropylacrylamide) (PNIPAM), among others.

Fabrication of Stretchable Anti-Fogging Tapes.

Figures 2A, 2B:
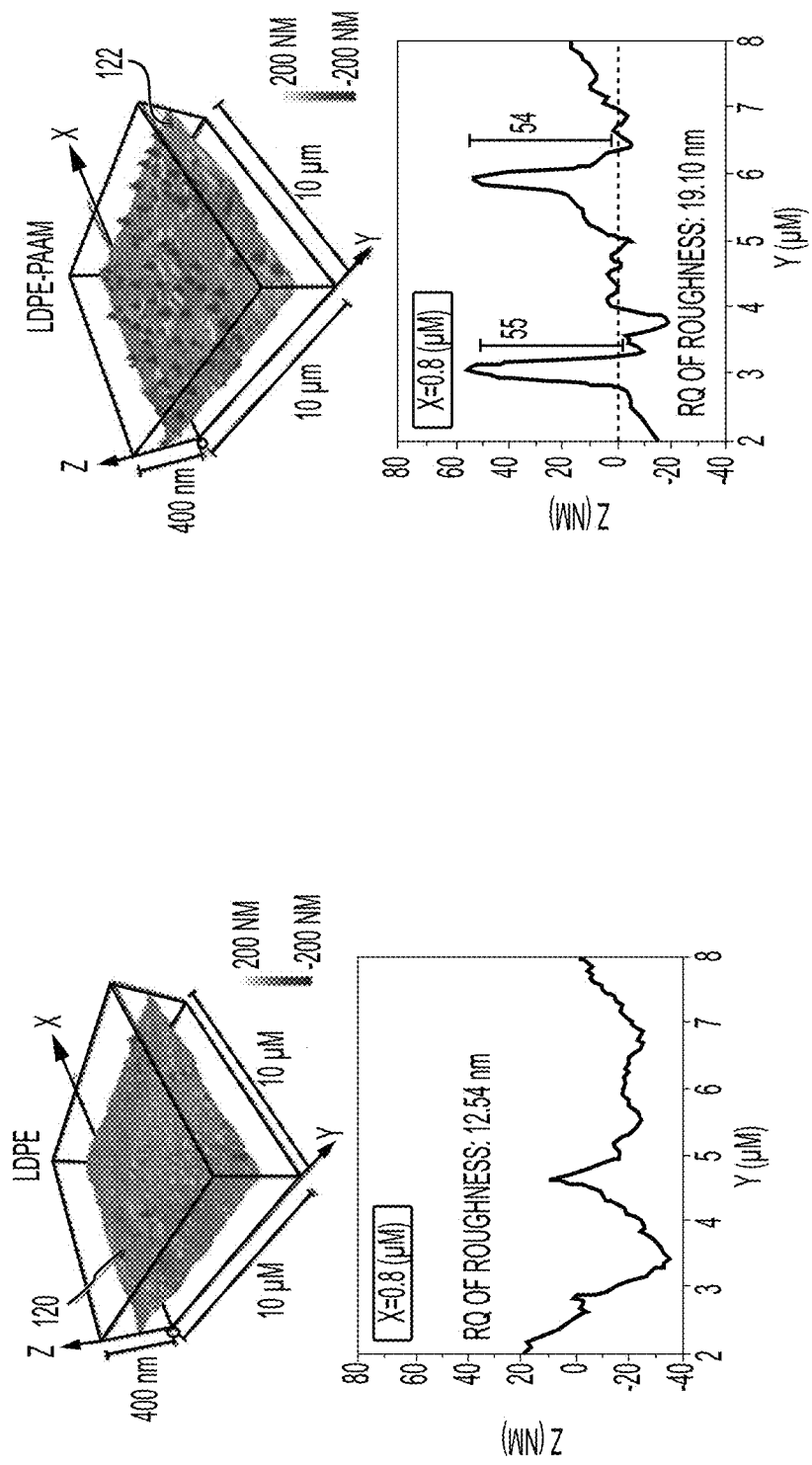
FIG. 2A is a schematic perspective view of an Atomic Force Microscopy (AFM) surface topology of a pristine low-density polyethylene (LDPE) film with a graph measuring its root mean square roughness.
FIG. 2B is a schematic perspective view of an AFM surface topology of a LDPE-uncrosslinked polyacrylamide (PAAm) film with a graph measuring a thickness of the LDPE-PAAm layer and its root mean square roughness.
Figure 2C:
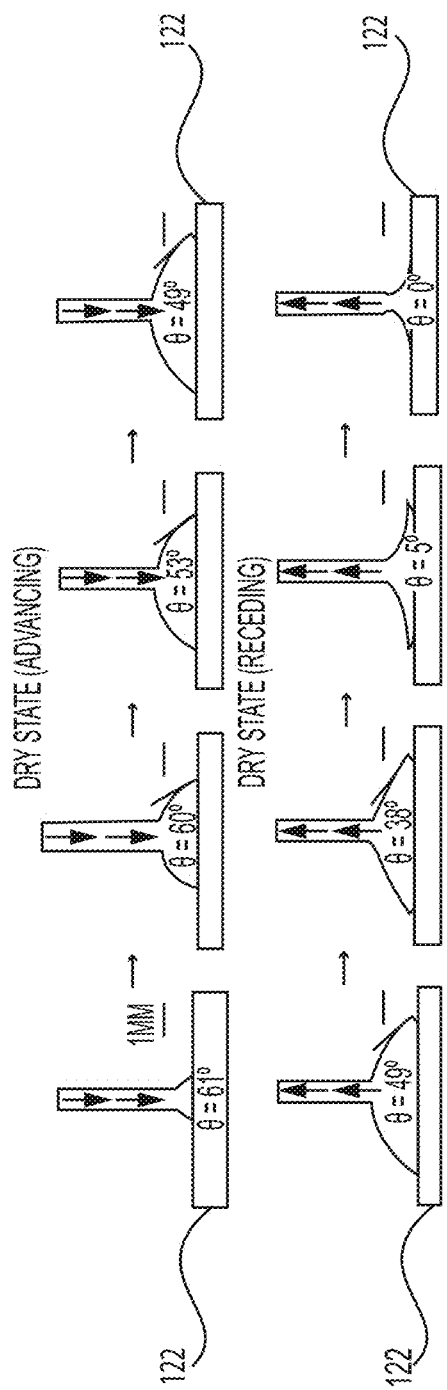
FIG. 2C is a schematic side view of contact angle measurements of the LDPE-PAAm layer of FIG. 2B in an advancing dry state and a receding dry state, with each set of four images in each row representing snapshots taken at various times.
Figure 2D:
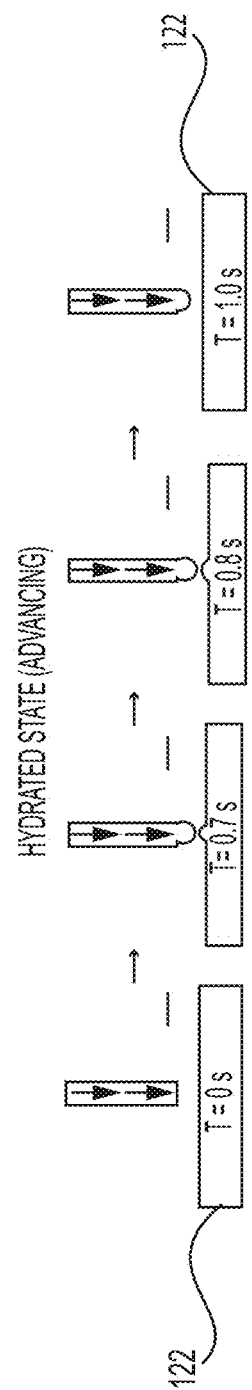
FIG. 2D is a schematic side view of contact angle measurements of the SAT in a hydrated state with the four images in each row representing snapshots taken at various times.
Figure 2F:
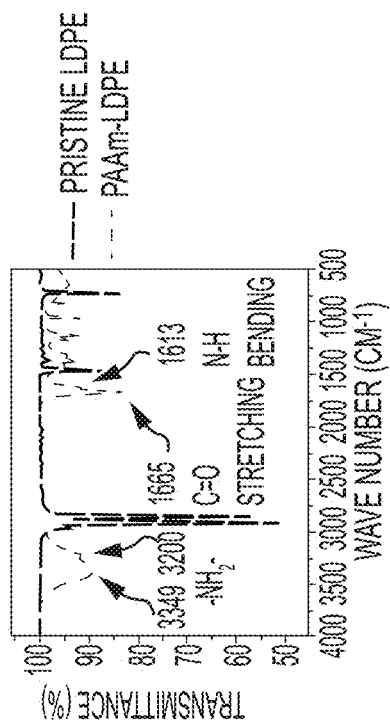
FIG. 2F is a graph illustrating a transmission Fourier-Transform Infrared (FTIR) spectra of the pristine LDPE film of FIG. 2A and the LDPE-PAAm film of FIG. 2B.

Given these superior mechanical and physical properties, the SAT 100 can be elastically pre-stretched and conformably adhered to one or more targeted transparent substrates 110. Adherence of the SAT 100 to the transparent substrate 110 can occur with seamless contact and no surface wrinkles, thereby effectively preserving the high transparency of the pristine transparent materials adhered with SAT. FIG. 1C illustrates an exemplary embodiment of the working principle for applying the SAT 100. For example, once the SAT 100 is peeled from the backing layer 102, as discussed with respect to FIG. 1A above, the LDPE film of the middle layer 104 of the SAT 100 can be biaxially pre-stretched and the pre-stretched LDPE film can be tightly attached and/or fixed to a flat surface (e.g., acrylic substrate). As shown by the arrows in FIG. 1C, the pre-stretch of the LDPE film 104 can occur on each edge of the film 104 and can effectively eliminate its surface wrinkles, which can otherwise reduce its optical transparency. On the upper surface of the pre-stretched LDPE film 104, a layer of loosely crosslinked PDMS of the bottom layer 108 can be spin-coated, followed by thermal curing at a mild temperature (e.g., approximately 50° C.) for approximately 12 hours. A mild temperature for PDMS curing can be selected to help prevent surface wrinkles that can be induced by the thermal-induced deformation of the LDPE film 104. Once the PDMS of the bottom layer 108 is cured, benzophenone-induced grafting photopolymerization can be used to covalently graft long-chain polymers of hydrophilic PAAm of the top layer 106 to the branched polymers of LDPE. The top surface 106 with grafted PAAm chains of the resultant SAT 100 can be thoroughly rinsed with deionized water to remove the unreacted reagents (i.e., acrylamide monomers). The Fourier-Transform infrared spectroscopy (FTIR) can be performed to characterize the chemical bonds of the SAT film, such as after thorough rinsing with deionized water. As shown in FIG. 2F, the resultant SAT film shows pronounced peaks associated with amide groups, indicating that the interaction between PAAm and LDPE provides for strong covalent anchorage rather than weak deposition or absorption of PAAm chains. The details on fabrication and chemical synthesis of the SAT are provided in the "Experimental Section" and FIG. 9A-9C, discussed in greater detail below.

When exposed to high-humidity environments, the transparent materials with SATs 100 can facilitate filmwise condensation, allowing the incident light to transmit them through with negligible light scattering. For example, the SATs 100 can be broadly applied to diverse transparent materials including but not limited to glass, polyethylene (PE), polyethylene terephthalate (PET), polystyrene (PS), poly(methyl methacrylate) (PMMA), and/or PDMS. Meanwhile, the SATs can be conformably adhered to curved transparent surfaces with varied radii of curvature. The SATs 100 can effectively maintain high total transmittance (approximately greater than 80%) and low diffuse transmittance (approximately less than 5%) in high-humidity environments. For example, when exposed to high-humidity environments, e.g., environments in which a surface of the SAT 100 is subjected to high-humidity water vapor, as shown in FIG. 1D, the transparent materials with SATs can facilitate filmwise condensation, allowing the incident light transmitted from a light source 112 to transmit therethrough with negligible light scattering. By way of non-limiting example, a high-humidity environment in this context can be an instance in which high-humidity water vapor acts on the film, and humidity increases from approximately 30% to approximately 100% and/or decreases from approximately 100% to approximately 30%. A person skilled in the art, in view of the present disclosures, will understand other percentages of humidity, ranges of humidity, and differences in humidity that can be considered a high-humidity environment in which the present disclosures allow for high total transmittance and low diffuse transmittance where such values were not previously possible prior to the present disclosure. Testing demonstrates that such anti-fogging performances further persist during at least a 193-day testing period, even under various modes of mechanical loadings such as uniaxial tension, punching, and/or cyclic scratching. Further, the SAT can be readily integrated with, by way of non-limiting examples, eyeglasses and protective goggles for clear fog-free vision, as discussed in greater detail with respect to FIGS. 7A-7F below, and used as a condensation cover in a solar still to improve its efficiency of freshwater production. Other uses in conjunction with transparent materials, objects, and so forth are contemplated herein and/or otherwise understood by a person skilled in the art in view of the present disclosures.

Surface and Mechanical Characterizations of Stretchable Anti-Fogging Tapes.

Atomic force microscopy can be performed to characterize the surface topology of the PAAm layer, which can be used to form the top layer 106, in the dry state. FIG. 2A illustrates AFM surface topology of a pristine LDPE film 120, or the middle layer 104 of the SAT 100 without the remaining layers, prior to application of the top layer 106, measuring its root mean square of roughness. FIG. 2B, by way of comparison, illustrates AFM surface topology of the LDPE film with covalently grafted uncrosslinked PAAm (e.g., LDPE-PAAm) film 122 measuring the thickness of the LDPE-PAAm layer 122 formed between the middle layer 104 and the top layer 106 and its root mean square of roughness. It will be appreciated that the LDPE-PAAm film 122 can be formed by disposing the LDPE of the top layer 106 onto the middle layer 104, or the SAT 100 without the adhesive bottom layer 108. In some embodiments, the top layer 106 can form covalent bonds with the middle layer 104, which can be insensitive to ambient humidity. Moreover, a person skilled in the art will recognize that in some embodiments the pristine LDPE film 120 can include the same structure as the middle layer 104, with the pristine LDPE film 120 serving as the middle layer onto which PAAm is added to form the LDPE-PAAm film 122, and/or the PDMS is added to form the SAT 100.

As shown, the thickness of the PAAm layer 106 can be about 55 nm in the dry state and its root mean square roughness can be about 19.1 nm, which is slightly higher than the roughness of the pristine LDPE film 120 (i.e., 12.5 nm). The thickness of the PAAm layer 106 can be greater than its thickness in the dry state due, at least in part, to the superior swelling of the grafted PAAm polymers.

Contact angle measurements can be conducted to characterize the surface wetting property of the anti-fogging tape. FIG. 2C illustrates contact angle measurements of the anti-fogging tape in the dry state with the four images in each row representing snapshots taken at different time points during the measurements, with time advancing from left to right. As shown, a total volume of approximately 10 μL deionized water can be deposited on the dry surface of the LPDE-PAAm layer 122. As the volume of the deposited water increases, the advancing contact angle gradually decreases from about 61° and reaches a steady-state value of about 49°. In at least some instances, the steady-state value can be approximately in the range of about 31° to about 49°, although a person skilled in the art will appreciate other values above and below that range are possible. As the volume of the deposited water decreases, such as when the dry state is receding when water is removed from the LPDE-PAAm layer 122, the measured receding contact angle decreases drastically from approximately 49° to 0°, suggesting the super hydrophilicity of the LPDE-PAAm layer 122 in the hydrated state. Deionized water can be further deposited on the hydrated surface of the LPDE-PAAm layer 122, as shown in FIG. 2D, illustrating contact angle measurement of the anti-fogging tape in the hydrated state. The water droplet on the nozzle can spread out in approximately 0.1 seconds once it contacts the LPDE-PAAm layer 122, further demonstrating its super hydrophilicity.

Figure 2E:
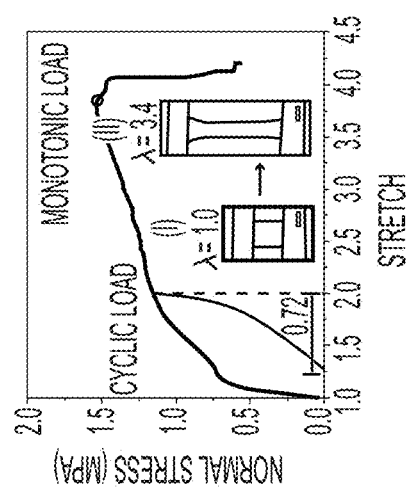
FIG. 2E is a graph illustrating a nominal stress versus stretch curves of the SAT under monotonic uniaxial tensile loading and cyclic uniaxial tensile loading.

In addition to surface characterizations, mechanical properties of the SAT film can be characterized. FIG. 2E illustrates a nominal stress versus stretch curves of SAT under monotonic uniaxial tensile loading and cyclic uniaxial tensile loading. The dot below the label "Monotonic load" in FIG. 2E indicates the failure point. Inset images (I) and (II) illustrate the SAT 100 in an undeformed state (i.e., λ=1) and a deformed state (i.e., λ=3.4), where λ is the ratio of the deformed length to the initial length of the SAT.

As shown in FIG. 2E, in at least some embodiments the SAT 100 can be stretched up to approximately 3.4 times its original length without interfacial delamination. This value can be approximately in the range of about 3 times its original length without interfacial delamination to about 4 times its original length without interfacial delamination. In at least some instances the SAT 100 can be stretched up to approximately 3.8 times its original length without interfacial delamination. Other values are also possible in view of the present disclosures, including those outside of the defined range above. A person skilled in the art, in view of the present disclosures, will understand how to achieve more optimal values outside of the stated range.

In addition, the SAT 100 can exhibit a remarkable elastic recovery with elastic recoverable strain approximately in the range of about 0.50 to about 1.00, and in some embodiments it can be approximately 0.72, as shown in FIG. 2E, which can keep it tightly bound to targeted transparent materials. The elastic recoverable strain of the SAT 100 can exceed that of common transparent materials (e.g., approximately less than 5% for PET, PS, PMMA). The SAT 100 can also be tough, with a high fracture energy of approximately 2,126 J $m^{-2}$, which can render its mechanical robustness when elastically pre-stretched and can allow it to be conformably adhered to targeted transparent materials. A person skilled in the art will recognize that the high fracture energy is impacted, at least in part, by a thickness of the PDMS layer 104 (or the equivalent layer(s) in other embodiments). Additionally, the adhesiveness between the SAT 100 and the backing layer (e.g., PET) 102 can be characterized, which can demonstrate a robust and reversible adhesive strength of approximately 4 kPa for 1000 cycles of attachment and detachment.

FIG. 2F illustrates transmission FTIR spectra of the pristine LDPE film 120 and the LDPE-PAAm film 122. The decreased transmission due to the $NH_2$ at 3200 $cm^{-1}$ and 3349 $cm^{-1}$, the C=O stretching at 1665 $cm^{-1}$, and N—H bending at 1613 $cm^{-1}$ indicates the anchored polyacrylamide chains.

Figure 2I:
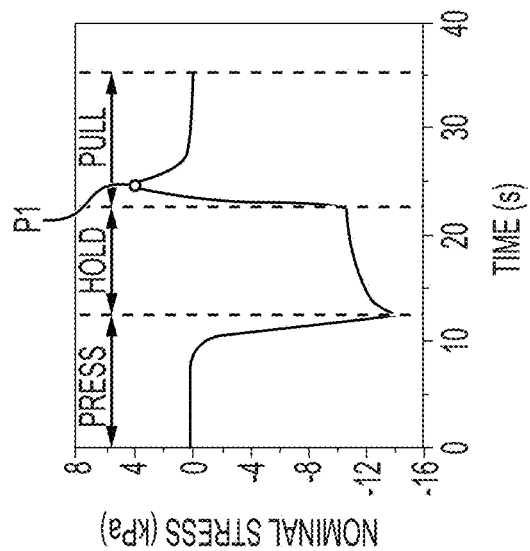
FIG. 2I is a graph illustrating nominal stress versus time under one cycle of loading of the test setup of FIG. 2G.
Figure 2H:
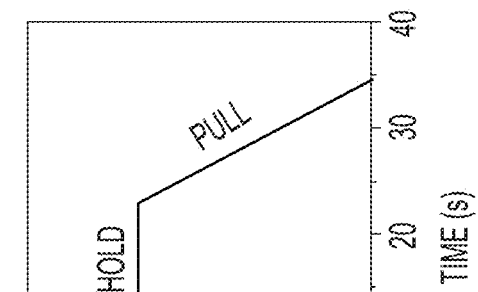
FIG. 2H is a graph illustrating controlled displacement versus time under one cycle of loading of the test setup of FIG. 2G, which includes three phases: pressing, holding, and pulling.
Figure 2G:
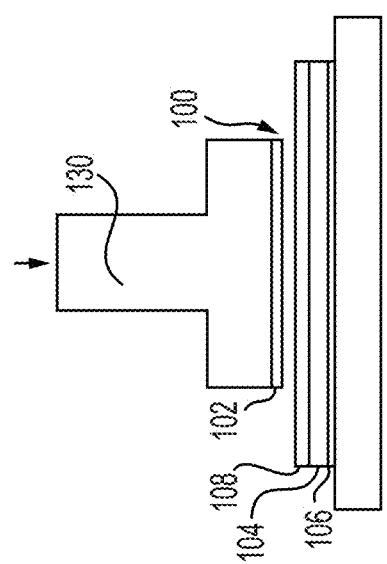
FIG. 2G is a schematic side view of a test setup for performing a pull-off adhesion test of the SAT.

In some embodiments, adhesive strength can be tested via a pull-off adhesion test. As shown in FIG. 2G, a PET substrate, such as the PET used in the backing layer 102, can be displaced and/or translated towards the SAT 100. The PET substrate can be disposed on an apparatus 130 configured to translate the PET substrate 102 into contact with the SAT 100, and specifically the PDMS of the bottom layer 108. After contacting the bottom layer 108, the apparatus 130 can translate in a second, opposite direction to remove the PET substrate 102 from it. Controlled displacement versus time under one cycle of loading of the apparatus can include, for example: i) a pressing phase, ii) a holding phase, and iii) a pulling phase, as shown in FIG. 2H. The results of one cycle of loading measuring nominal stress versus time is shown in FIG. 2I. As shown, maximum adhesion strength is indicated by data point P1, which occurs in the initial seconds of the pull phase, e.g., at approximately 25 seconds.

Optical Characterizations of Stretchable Anti-Fogging Tapes.

FIGS. 3A-3G illustrate characterization of water condensation on both the pristine LDPE film 120 and the LDPE-PAAm film 122. The characterization can be achieved, for example, by heating a water container 132 having water 134 by a hot plate 136 at a controlled temperature. In some embodiments, the water container 132 can be heated for approximately 20 minutes to reach a steady state, though one skilled in the art will recognize that heating can vary, e.g., for approximately 15 minutes, approximately 10 minutes, and/or approximately 25 minutes before steady state is reached. A thermocouple (not shown) or other temperature-monitoring device can be used to monitor the temperature of the water 134 inside the container 132. Thereafter, the sample can be covered on top of the water container 132 with heated water vapor condensing on its bottom surface. Optical microscopy by way of an optical microscope 138 can be used to capture the real-time morphology of the condensed water. As shown in FIGS. 3B and 3C, optical microscopy can reveal that the pristine LDPE film 122 can facilitate dropwise condensation due, at least in part, to its hydrophobicity. The surface of the pristine LDPE film 120, which lacks an anti-fogging film, can result in beads of condensate 140 being formed on a surface thereof, as shown.

FIGS. 3D-3E illustrate a surface of water condensate forming a predominantly continuous water film 142 on a surface of the LDPE-PAAm film 122 of the present embodiments rather than water droplets as in FIGS. 3B and 3C, shown above. For example, the LDPE-PAAm film 122 can promote continuous filmwise condensation 142 at least because of its superior hydrophilicity in the hydrated state and/or in response to a high-humidity environment. A person skilled in the art will recognize that a predominantly continuous water film is a film that has no tears or breaks over approximately 90%, and in some embodiments, over approximately 95%, of its length. The film condensate 142 can result in a measured water contact angle on the LDPE-PAAm film in the dry state and in the hydrated state similar to that discussed in FIGS. 2C and 2D above, while FIG. 3F illustrates a contact angle of approximately 110 degrees for the pristine LPDE film 120. Lower water contact angle values can lead to greatly reduced light scattering when light passes through the film, thereby resulting in high total transmittance. For example, when light, e.g., a bundle of rays, hits a layer of water film on top of a polymer, some of the bundle of light can be reflected, some absorbed, and the rest can be transmitted through the film. When these bundles travel through the LDPE-PAAm film 122, the bundles can follow geometrically ordered paths that can likely result in a low haze in images observed by reflected or transmitted light. Water droplets on the pristine film 120 having droplets formed thereon, on the other hand, can cause these light bundles to be reflected and transmitted in various angles and/or at random paths, which can result in the formation of hazy, low visibility images on such films.

To systematically characterize the effect of the condensed water on optical properties of the film, ultraviolet-visible-near-infrared (UV-vis-NIR) spectroscopy can be further performed to quantify the total transmittance and diffuse transmittance throughout samples before and after condensation. The measurements follow the standard of ASTM D1003. The total transmittance characterizes the total percentage of the incident light directly and diffusely transmitting through the sample, while the diffuse transmittance measures the percentage of the incident light diffusely transmitting through the sample. As illustrated in FIG. 4A, testing can be performed by positioning a light source 131 to irradiate a sample 133 having an aperture 135 formed therein. When light from the light source 131 passes through the aperture 135, it scatters into a plurality of directions forming an integrating sphere 137. A detector 139 and a light trap 141 are distributed along the integrating sphere 137 to detect light scattering through the aperture 135 and prevent light from escaping, respectively. The total transmittance $T_t$ can be calculated by the ratio of the light transmitted through the specimen $T_2$ versus the incident light $T_1$, that is, $T_t=T_2/T_1$. The diffuse transmittance $T_d$, as shown in FIG. 4B, can be calculated by $T_d=[T_4-T_3(T_2/T_1)]/T_1$, where $T_3$ is the light scattered by the instrument and $T_4$ is the light scattered by both the instrument and the sample.

FIGS. 4C-4E illustrate light transmittance in the pristine LDPE film 120 and the FIGS. 4F-4H illustrate light transmittance in the LDPE-PAAm film 122. When exposed to heated water vapor at approximately 50° C. (the temperature refers to the measured temperature of the liquid water in the container), the total transmittance of the pristine LDPE 120 can decrease significantly, for example, from approximately in the range of about 92% to about 75% in the visible spectrum, and from approximately in the range of about 92% to about 60% in the near-infrared spectrum, due, at least in part, to the backscattering of light by water droplets, as illustrated in FIGS. 4C and 4D. In contrast, the LDPE-PAAm film 122 shows negligible loss of transmittance over the entire spectrum in spite of a slight decrease of total transmittance approximately in the range of about 1700 nm to about 1800 nm due to the light absorption by water, as illustrated in FIGS. 4F and 4G. The diffuse transmittance of both the pristine LDPE 120 and LDPE-PAAm films 122 can also be measured to characterize their haze when exposed to heated water vapor at approximately 50° C. As shown in FIG. 4E, the diffuse transmittance of the pristine LDPE film 120 increases approximately in the range of about 8% to about 48% in the visible spectrum due, at least in part, to its dropwise condensation. In contrast, the filmwise condensation can maintain a low diffuse transmittance of the LDPE-PAAm 142, as shown in FIG. 4H, below approximately 5% across the spectrum, manifesting the low haze of a uniform water film before condensation and after condensation when exposed to hot water vapor. The total transmittance and diffuse transmittance of the LDPE-PAAm 122 after condensation as provided for in conjunction with the present disclosure outperforms those of the commercially available anti-fogging products including the anti-fog spray (Optix 55), anti-fog wipes (KarisVisual), anti-fog mirror window film (Kerkoor), and anti-fog greenhouse film (Agfabric). These commercially available anti-fogging products mostly rely on spraying hydrophilic agents or addition of surfactants.

Water vapor temperature is a well-known factor affecting the optical transparency of the film after condensation due to the altered size of the condensed water droplets. The increase of the water vapor temperature can drastically decrease the total transmittance of the pristine LDPE film 120 at least because of the enlarged water droplet 140 on the film. In contrast, the water vapor temperature has little effect on the LDPE-PAAm film 122, which indicates the water vapor temperature does not change the thickness of the condensed water film 142. Adding a coated PDMS layer 108 on the optical properties of the SAT can slightly decrease the total transmittance from approximately in the range of about 92% to about 88% in the visible and near-infrared spectrum, and can slightly increase the diffuse transmittance from approximately in the range of about 2% to about 5% across the entire spectrum. More particularly, the presence of the PDMS layer 108 can decrease the total transmittance in the ultraviolet spectrum, at least because of the high absorption of ultraviolet light of PDMS.

Persistence and Universality of Anti-Fogging Properties.

Figure 5A:
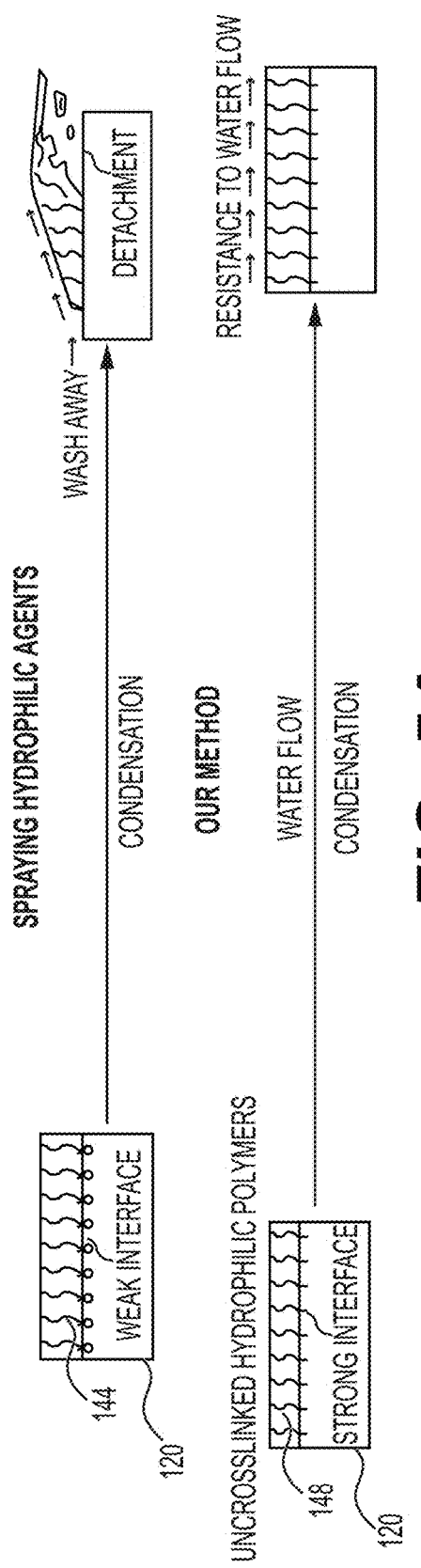
FIG. 5A is a schematic illustration of a comparison of an existing method and methods of the present disclosure showing an effect of spraying hydrophilic agents onto transparent materials and methods of covalently grafting uncrosslinked hydrophilic polymers.
Figure 5B:
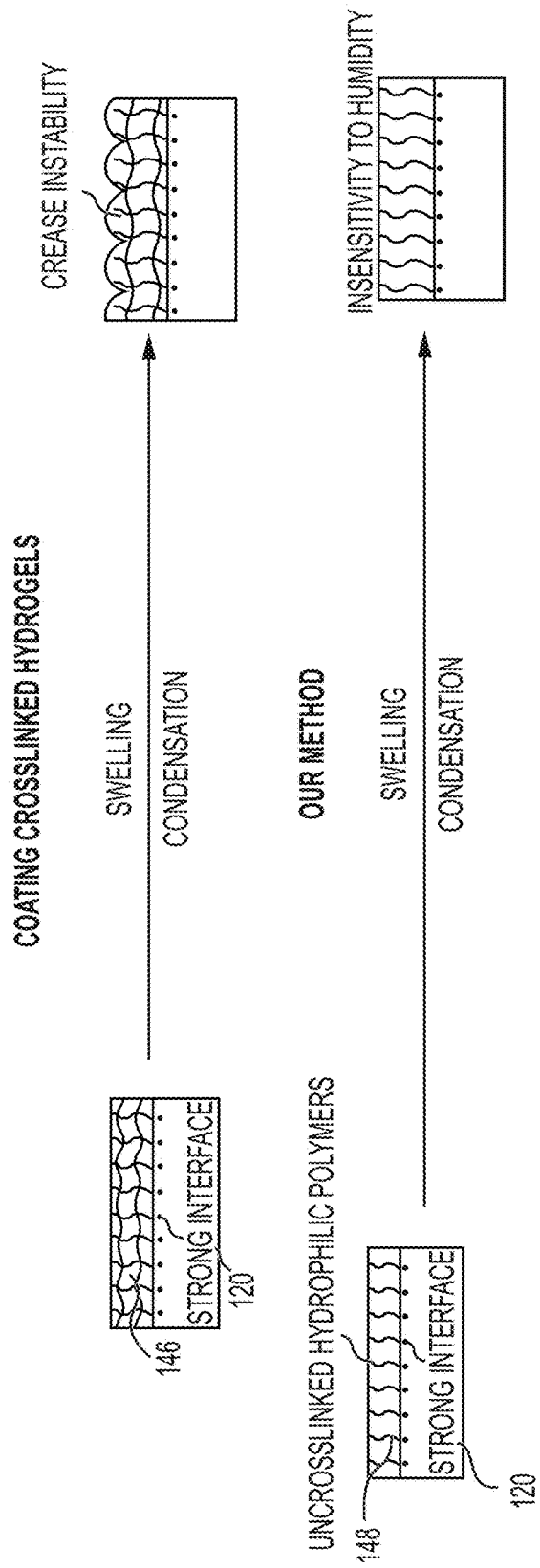
FIG. 5B is a schematic illustration of a comparison of an existing method and methods of the present disclosure of coating crosslinked hydrogels when exposed to high-humidity environments and swelling of uncrosslinked hydrophilic polymers in high-humidity environments.

Persistent anti-fogging properties are a central challenge faced by existing anti-fogging approaches but highly desirable for practical deployment. For example, the existing method of spraying hydrophilic agents suffers short lifetime due to the weak interface between the hydrophilic agents and transparent materials. One example for addressing this challenge is shown in FIG. 5A, which illustrates a comparison of a conventional method of spraying hydrophilic agents and the presently disclosed methods for coating cross-linked hydrogels. Spraying the LDPE film 120 with hydrophilic agents 144 as in the conventional methods, can cause the film 120 to exhibit decreased optical transparency when exposed to heated water vapor, e.g., at approximately 60° C. for approximately 14 minutes. The hydrophilic agents 144 are washed away by condensed water on the surfaces continuously due, at least in part, to the weak interaction between hydrophilic agents and transparent materials. It will be appreciated that the SAT 100 of the present embodiments can be devoid of each of an anti-fog spray, hydrophilic spray agents, and/or hydrophilic surfactants. As another example shown in FIG. 5B, the LDPE film 120 covalently coated with a layer of crosslinked hydrogel 146 loses its optical transparency when the film is exposed to heated water vapor, e.g., at approximately 60° C. for approximately 20 minutes, due, at least in part, to the crosslinked hydrogel tending to develop swelling-induced crease instability on the surface. In contrast, swelling of uncrosslinked hydrophilic polymers 148, as shown, does not affect the transparency of the film, giving high transparency in high-humidity environments.

Figure 5C:
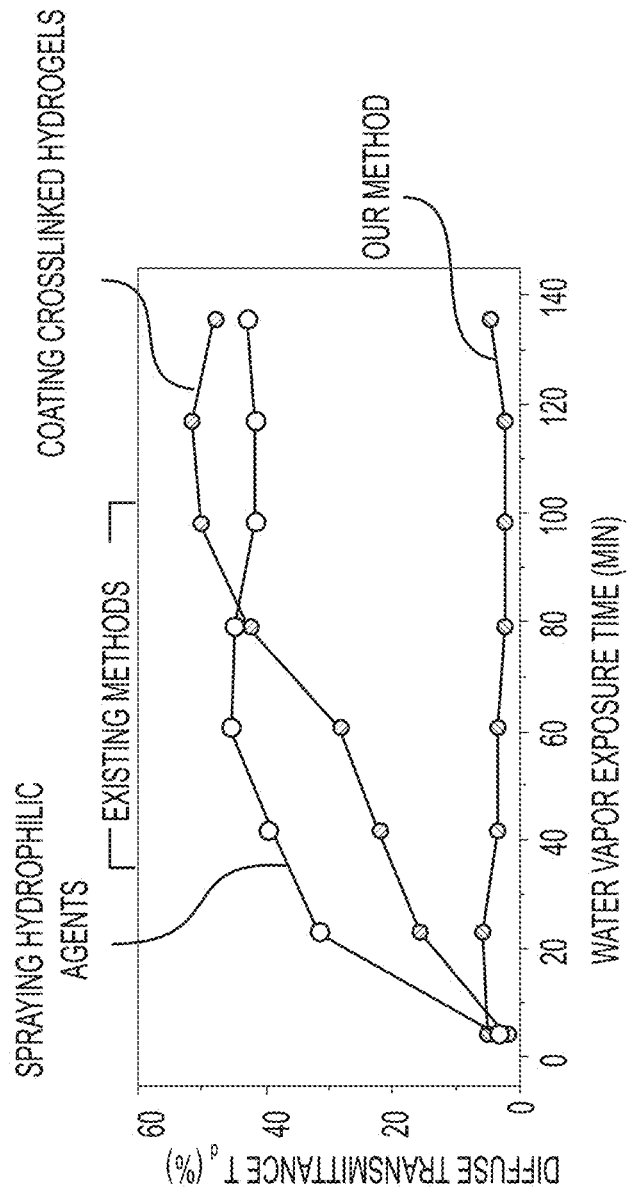
FIG. 5C is a graph illustrating a comparison of measured diffuse transmittance among existing anti-fogging methods and methods of the present disclosure as a function of water vapor exposure time.

FIG. 5C illustrates a comparison of the measured diffuse transmittance among existing anti-fogging methods and methods of the present disclosure as a function of water vapor exposure time. In some embodiments, the total transmittance of the disclosed LDPE-PAAm film 122 can consistently maintain high total transmittance over approximately 80%, and in some embodiments over approximately 90%, and low diffuse transmittance below approximately 10% across the visible and near-infrared spectrum for at least 193 days. The durable anti-fogging properties of the provided approaches herein further justify that the interaction between PAAm and LDPE is strong covalent anchorage rather than weak deposition or absorption of PAAm polymers.

The anti-fogging properties of the LDPE-PAAm film 122 under various modes of mechanical loadings, including biaxial tension and/or dynamic scratching, demonstrate the further utility of the presently disclosed techniques, tapes, films, and resulting objects. For example, punching loading can be applied on a circle-shaped film with a diameter of approximately 65 mm to simulate biaxial tensile loading. For example, the LDPE-PAAm film can maintain high total transmittance over approximately 80% and low diffusive transmittance below approximately 5% even when the punching displacement increases up to approximately 15 mm. When the applied punching displacement reaches approximately 20 mm, the diffuse transmittance can increase due, at least in part, to the excessive plastic deformation induced in the film.

Dynamic scratching is another common mechanical load that may damage the anchored PAAm layer. To simulate the load of dynamic scratching, a probe to compress the LDPE-PAAm film and apply a reciprocating motion of the probe can be used. The compressive forces can be monitored from 0 N to approximately 4.8 N, corresponding to the normal pressure of 0 kPa to approximately 20 kPa as the contact area between the probe and the LDPE-PAAm film is approximately 200 mm². Both the total transmittance and diffuse transmittance can be measured after 100 cycles of dynamic scratching under various compressive forces. In such embodiments, the LDPE-PAAm can maintain a high total transmittance above approximately 80% and low diffuse transmittance below approximately 10%, indicating its remarkable mechanical robustness under various loads of dynamic scratching.

The SAT 100 can be adhered to substrates with diverse materials (e.g., PET, PDMS, PMMA, PS, glass) and geometries (e.g., cylindrical tubes with varied curvatures) to demonstrate the anti-fogging tape can be applicable to universal substrates. Given the high stretchability, large elastic recovery, high toughness, and reversible adhesion of the SAT, the SAT can be pre-stretched and then adhered to substrates with seamless contact and no surface wrinkles.

Figure 6A:
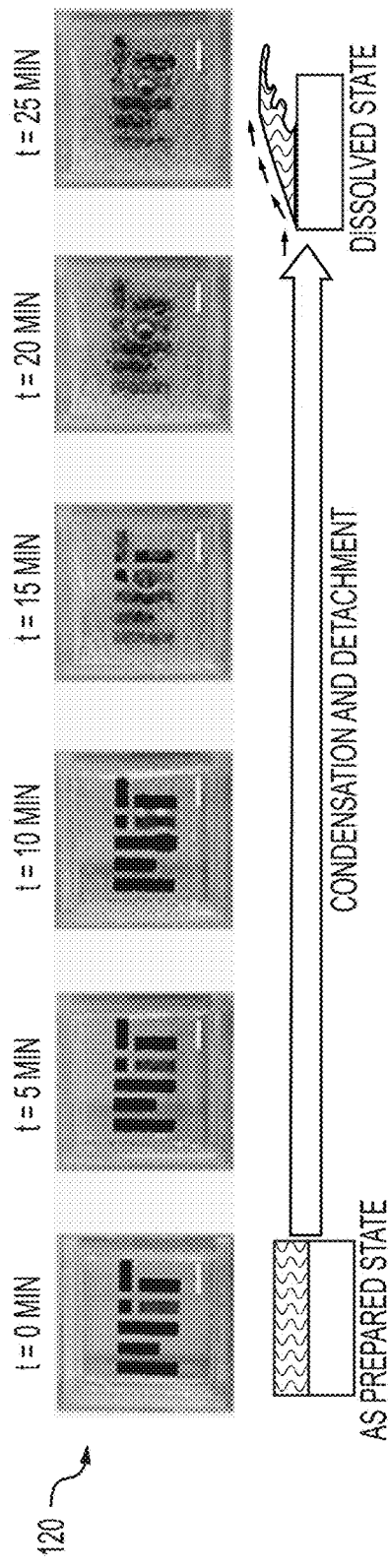
FIG. 6A includes optical images of a top view of an LDPE film sprayed with hydrophilic agents (Optix 55), showing decreased optical transparency when the film is exposed to heated water vapor for various lengths of time from an as prepared state to a dissolved state.
Figure 6B:
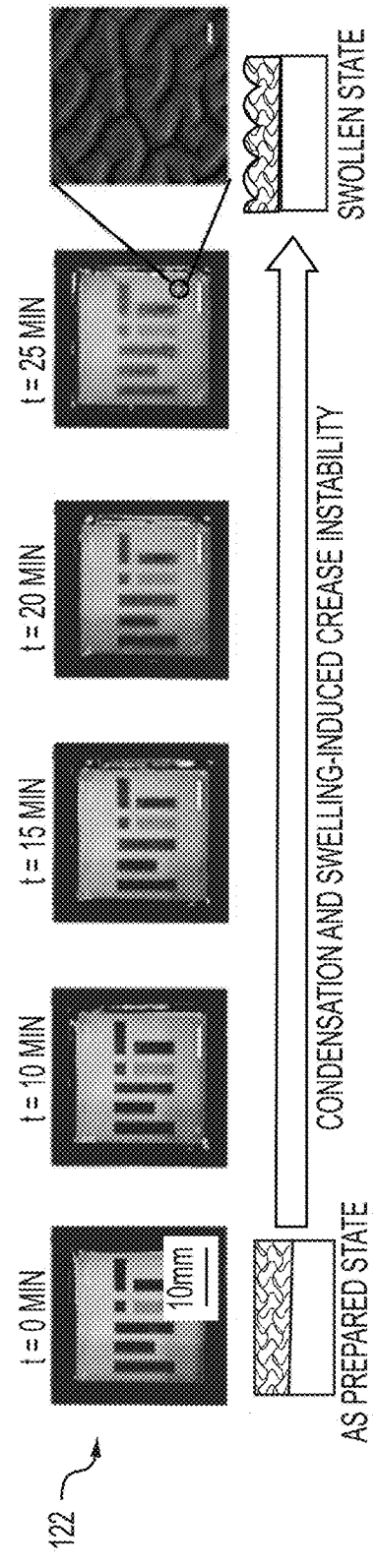
FIG. 6B includes optical images of a top view of the LDPE film of FIG. 6A, but rather than sprayed with hydrophilic agents, coated with crosslinked PAAm hydrogel, showing decreased optical transparency when the film is exposed to heated water vapor for various lengths of time from an as prepared state to a swollen state.

FIGS. 6A and 6B illustrate optical images of the limitations of existing anti-fogging methods. For example, the LDPE film 120 sprayed with hydrophilic agents (e.g., Optix 55) shows decreased optical transparency when the film is exposed to heated water vapor for about 15 minutes. Due, at least in part, to the weak interaction between the hydrophilic agents and the LDPE film, the hydrophilic agents are washed away and subsequently detached from the surfaces of transparent materials over long-term condensation, as shown in FIG. 6A. Optical images of the LDPE-PAAm film 122 coated with crosslinked PAAm hydrogel, as shown in FIG. 6B, shows decreased optical transparency when the film is exposed to heated water vapor for about 20 minutes. While the interfacial bonding between the crosslinked hydrogel and the LDPE film can be strong, the crosslinked hydrogel can form swelling-induced crease instabilities, which can result in reduced transparency in high-humidity environments.

Figure 6C:
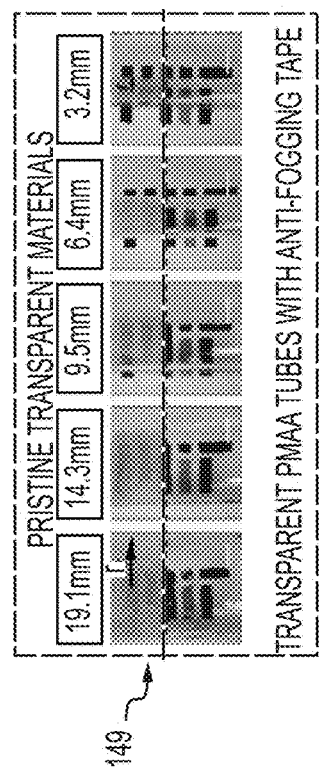
FIG. 6C is a comparison of dropwise condensations on optical images of a top view of pristine transparent films (i.e., PE, PET, PDMS, PMMA, PS, Glass) as compared to condensations formed on the same films with the SAT of the present disclosure.
Figure 6E:
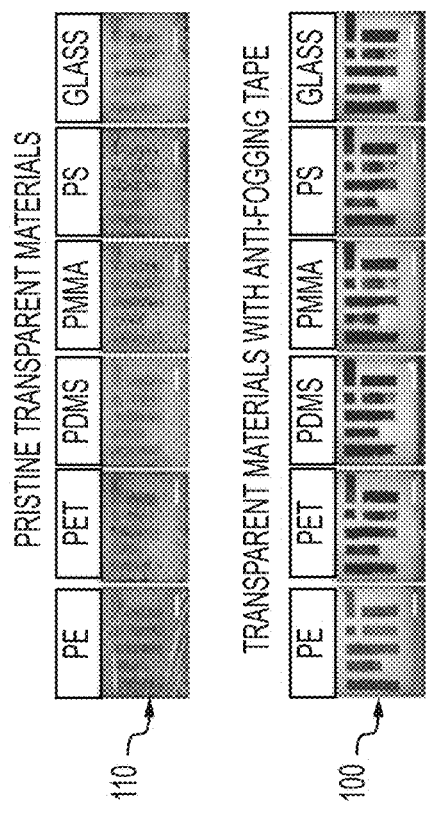
FIG. 6E is a comparison of dropwise condensations on optical images of a top view of pristine curved PMMA tubes with various radii of curvature.
Figure 6D:
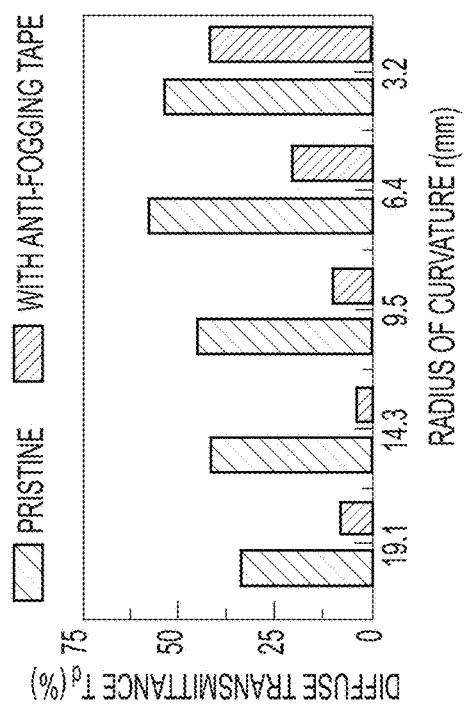
FIG. 6D is a graph illustrating measured diffuse transmittance of the pristine transparent films of FIG. 6C and the same films with SAT of the present disclosure.
Figure 6F:
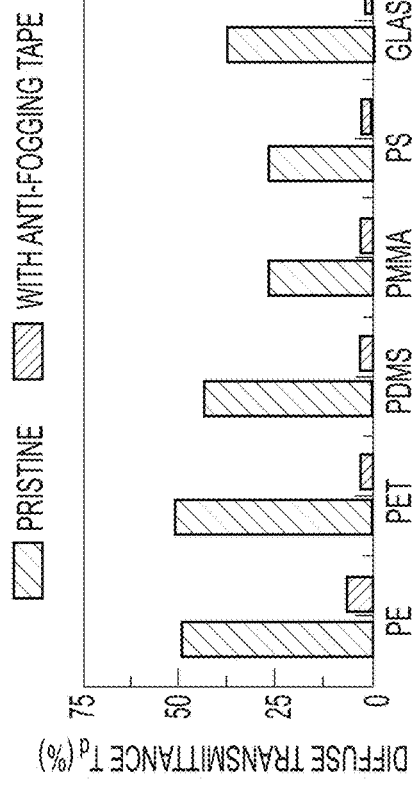
FIG. 6F is a graph illustrating measured diffuse transmittance of the pristine curved PMMA tubes of FIG. 6D with various radii of curvature and the same tubes with the SAT of the present disclosure.
Figure 7C:
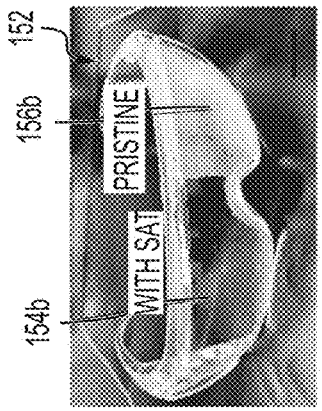
FIG. 7C is a perspective view of safety goggles having a lens of pristine glass and another lens with SAT adhered onto the inner surface thereof
Figure 7B:
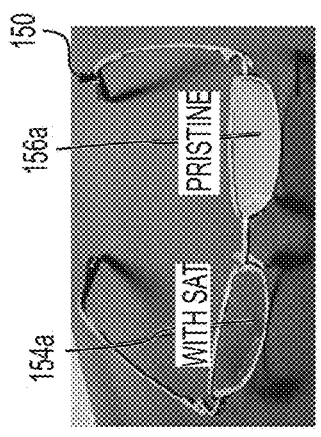
FIG. 7B is a perspective view of eyeglasses having a lens of pristine glass and another lens with SAT adhered onto the inner surface thereof.
Figure 7A:
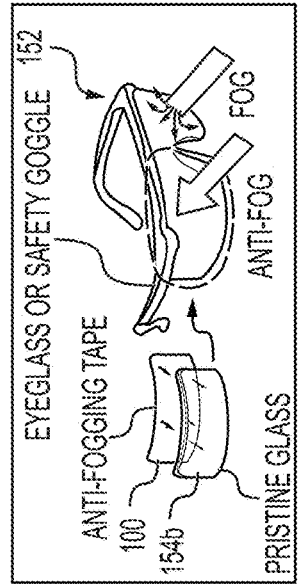
FIG. 7A is a schematic perspective view of an embodiment of the SAT applied to a lens of pristine glass in eyewear.
Figure 7F:
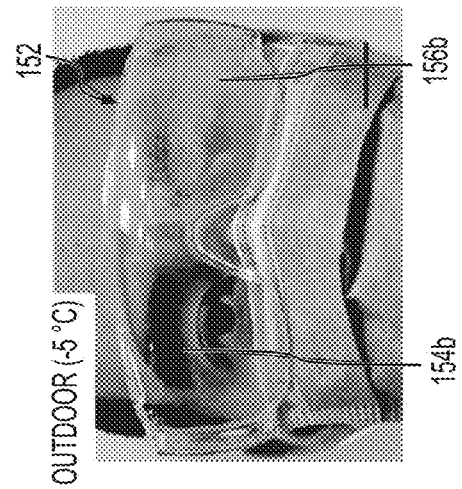
FIG. 7F is a photograph showing an outdoor fogging test of protective goggles of FIG. 7C at the temperature of approximately −5° C.
Figure 7E:
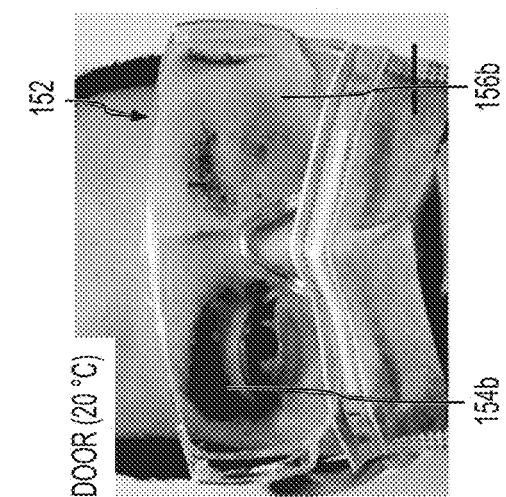
FIG. 7E is a photograph showing an indoor fogging test of protective goggles of FIG. 7C at room temperature of approximately 20° C.
Figure 7D:
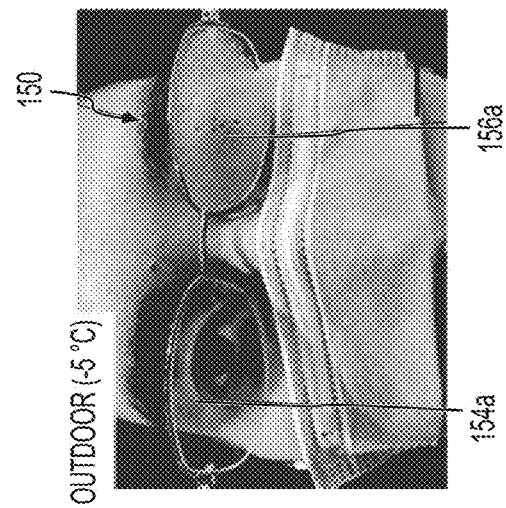
FIG. 7D is a photograph showing an outdoor fogging test of the eyeglasses of FIG. 7B at a temperature of approximately −5° C.

FIG. 6C illustrate the anti-fogging properties of the SAT 100 of the present embodiments when applied to a transparent material 110, e.g., PE, PET, PDMS, PMMA, PS, Glass. For example, when further exposed to heated water vapor, the transparent materials 110 coated with SAT 100 show superior anti-fogging properties, giving clear fog-free vision, as illustrated in FIG. 6C. The total transmittance of the visor materials with SATs can reach as high as approximately 80%, and the diffuse transmittance can be as low as approximately 5% in the visible spectrum, as shown in FIG. 6D. The SAT 100 can be conformably attached to inner surfaces of PMMA tubes 149, for example, as shown in FIG. 6E, with altered radii of curvature at least approximately in the range of about 3.2 mm to about 19.1 mm (i.e., 3.2 mm, 6.4 mm, 9.5 mm, 14.3 mm, 19.1 mm, or larger). In some embodiments, the SAT 100 can be conformally attached to flat objects or curved objects, and/or flat or curved surfaces of said objects. The SAT 100 can be conformally attached to objects having a radius of curvature approximately in the range of about 3.2 mm to about 10 meters, approximately in the range of about 3.2 mm to about 7 m, approximately in the range of about 3.2 mm to about 5 m, approximately in the range of about 3.2 mm to about 1 m, approximately in the range of about 3.2 mm to about 100 mm, and/or approximately in the range of about 3.2 mm to about 50 mm. In fact, a person skilled in the art will appreciate that the presently disclosed techniques can be applicable to curved surfaces with an even wider range of radii of curvature. As shown in FIG. 6E, the SAT can effectively impart the curved surfaces with anti-fogging properties (i.e., high total transmittances and low diffuse transmittances), giving clear fog-free vision when exposed to high-humidity and high temperature, as shown in FIG. 6F. Given the high stretchability of the anti-fogging tape, new functions for eliminating fog on soft, stretchable, and foldable transparent materials can be possible. In some embodiments, the stretchable transparent materials (e.g., PDMS) with anti-fogging tape can combat fogging issues at highly deformed states when exposed to heated water vapor, e.g., approximately 60° C. By way of a further non-limiting example, a foldable transparent material can maintain its transparency for at least about 30 minutes when exposed to heated water vapor (e.g., approximately 60° C.).

Applications of Stretchable Anti-Fogging Tapes.

In view of the validation of the superior anti-fogging performance and remarkable mechanical robustness of the SAT, the applications of SATs on optical and solar devices that are susceptible to fogging, including eyeglasses, goggles, and solar stills, among other applications, become possible.

By way of non-limiting example, the SATs of the present disclosure can be used to solve the fogging issue of eyeglasses 150 and safety goggles 152. For example, as shown in FIGS. 7A-7F, one or more lenses 154a, 154b of the eyeglasses 150 and the safety goggles 152, respectively, can be coated with the SATs 100 to improve the anti-fogging properties thereof. To illustrate how the SAT 100 of the present disclosure improves performance of a lens, the glasses 150 have a lens 154a coated with the SAT 100 and a second lens 156a that is pristine glass. As shown, the lens 154a can include the SAT 100 attached to an inner surface thereof, which allows the lens 154a to maintain clear vision when exposed to a humid environment and a sudden change of temperature. For example, as shown in FIGS. 7C-7F, the provided SAT 100 can effectively maintain clear vision in the lenses 154a, 154b in an indoor environment with a room temperature of approximately 20° C. and in an outdoor environment with a cold temperature of approximately −5° C., respectively. In comparison, the fogging on the pristine lenses 154b, 156b in the same environments can severely block vision, as shown.

Figure 8A:
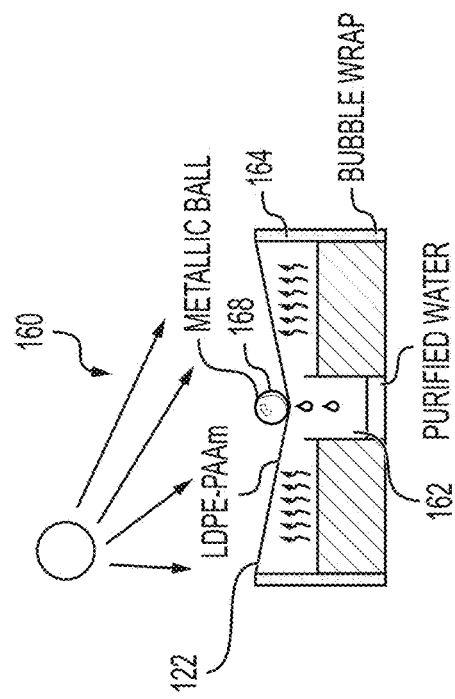
FIG. 8A is a schematic perspective view of one embodiment of a solar still using LDPE-PAAm as the condensation cover to enhance solar-powered freshwater production.

By way of further example, the presently disclosed LDPE-PAAm film 122 can be used for efficient solar energy harvesting and/or for water desalination. For example, the LDPE-PAAm film 122 can be used as a condensation cover in a sunlight-powered water purification system or solar still 160, as shown in FIG. 8A. Normally, the evaporated water vapor from brine 162 in the system 160 can condense as droplets on the collection cover of the solar still 160, resulting in a reduction of optical transparency by approximately 35%.

Figure 8B:
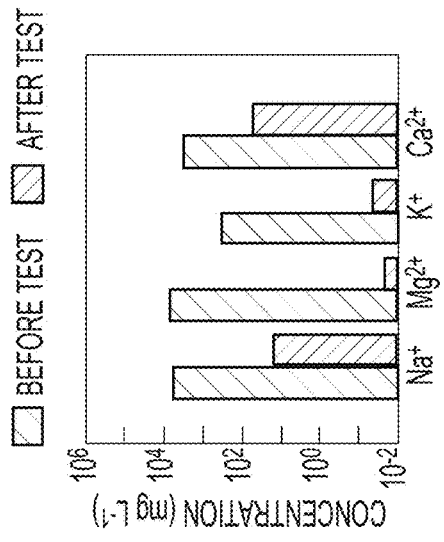
FIG. 8B is a schematic side view of a structure of the solar still of FIG. 8A.
Figure 8C:
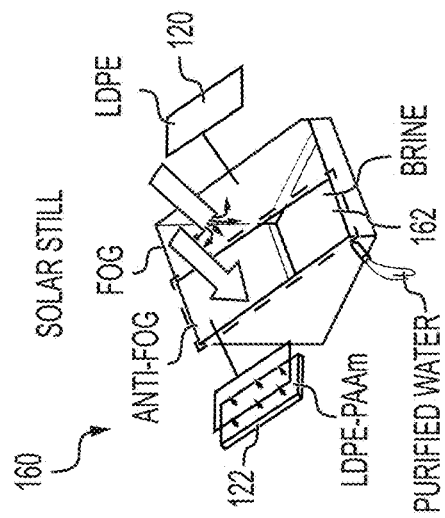
FIG. 8C is a top view of collected purified water over time for two water purification systems of the present disclosure with the pristine PE film and LDPE-PAAm film as the condensation cover from about 9:00 to about 20:00 on the same given date.

FIGS. 8B and 8C illustrate a prototype of a water purification system 160 under natural sunlight and testing performed thereon in greater detail. As shown, the prototype can include a black super-absorbent foam (not shown) as an absorber of the sunlight, an LDPE-PAAm film 122 as a condensation cover, a beaker 162 as a purified water collector, and a bubble wrap layer 164 as a thermal insulation layer. A metallic ball 166 can be placed on top of the condensation cover, directing the condensed water to drip into the beaker 162 by gravity. In some embodiments, a reference system with a pristine LDPE film 120 as the condensation cover can be set-up as a control comparison. A person skilled in the art will appreciate alternative materials that can be used in conjunction with creating a water purification system for use in the field that is equivalent to the illustrated water purification system 160. By way of non-limiting example, insulation can be provided by a more robust insulator than a bubble wrap layer 164, such as a polyurethane foam (PUF).

FIG. 8C illustrates a comparison of outdoor water purification tests taken at the same time of day by a water purification system 160 using the pristine LDPE film (top row) and the LDPE-PAAm film 122 used to make up the SAT 100 of the present embodiments. The LDPE-PAAm film 122 as the condensation cover can maintain high transparency with negligible fogging for the entire day, while, as shown in FIG. 8C, the pristine LDPE film 120 has significant surface fogging from 9:00 AM. Due to the superior anti-fogging performance, the LDPE-PAAm film 122 enables the solar water purification system 160 to reach a water collection rate of approximately 3.8 L·m² per day, which is approximately 2.4 times greater than that of the reference system (e.g., pristine LDPE film as the condensation cover, which has a water collection rate of approximately 1.6 L·m² per day). The reduction of the light back-scattering by the LDPE-PAAm condensation cover 122 can be further validated by the increased absorber temperature, vapor temperature, and/or bulk water temperature.

Figure 8D:
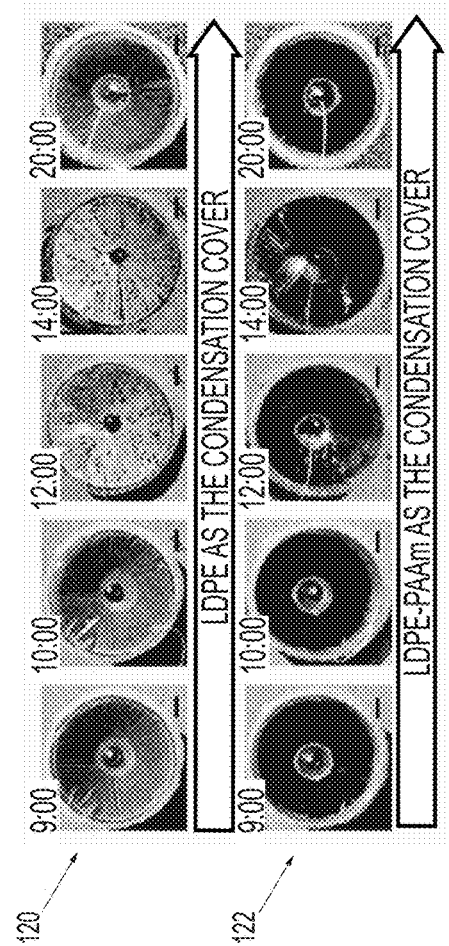
FIG. 8D is a graph illustrating measured concentration of the primary ions $Na^+$, $Mg^{2+}$, $K^+$, and $Ca^{2+}$ before and after solar-powered desalination.

To further demonstrate the capability of solar-powered water purification, the concentrations of four primary ions ($Na^+$, $Mg^{2+}$, $K^+$, and $Ca^{2+}$) can be measured before and after desalination, as shown in FIG. 8D. These ions in the collected water are significantly reduced and below the values for drinkable water according to US Environmental Protection Agency (EPA). The collection efficiency of both of the water purification systems can be further evaluated using the following definition:

$$\eta_{water} = \frac{m_{water} h_{water} + m_{water} C_p (T_{water} - T_{ambient})}{A_{evap} \int q_{solar} dt}, \quad (1)$$

where $m_{water}$ is the collected purified water per day $h_{water}$=2400 kJ/kg is the latent heat for evaporation of water at 50° C., $C_p$=4186 J/(° C. kg) is the specific heat of water, $T_{water}$ is the temperature of water at the surface with an average value of 50° C. for the HPE film and 45° C. for the pristine PE film, $T_{ambient}$ is the ambient temperature with an average value of 35° C., $A_{evap}$ is the evaporation area, and $q_{solar}$ is the time-dependent solar flux. Following Eq. (1), the water purification system using the LDPE-PAAm film 122 as the condensation cover can reach a water collection efficiency as high as approximately 36.2%, which is approximately 2.4 times greater than the same system using the pristine LDPE film 120 as the condensation cover (i.e., approximately 15.1%). Note that the water collection efficiency for the state-of-the-art floating solar still is approximately 24%. The LDPE-PAAm film 122 of the present disclosure, as the simplest design of condensation structure, can be readily integrated with existing evaporation structures with no significant investment in cost while increasing the water collection efficiency.

Experimental Section

The materials, techniques, and other disclosures provided in this section are provided to demonstrate viability of the present disclosure, and to provide one or more non-limiting exemplary ways by which the present disclosures can be implemented and/or tested. The use of any parameters, materials, values, etc. are not intended to be limiting. A person skilled in the art, in view of the present disclosures, will understand other materials, techniques, parameters, values, etc. that can be used without departing from the spirit of the present disclosure.

Materials. Chemicals including acrylamide, benzophenone, Irgacure-2959, and Sylgard 184 were purchased from Sigma-Aldrich. Saran Premium Wrap as low-density polyethylene was purchased from Johnson. NHS-Fluorescein was purchased from Thermo Fisher Scientific. Visor materials including PET, Glass, PMMA were purchased from McMaster-Carr. All chemicals were used without further purification. Deionized water (from a Milli-Qsystem) was used throughout the experiments.

Figure 9A:
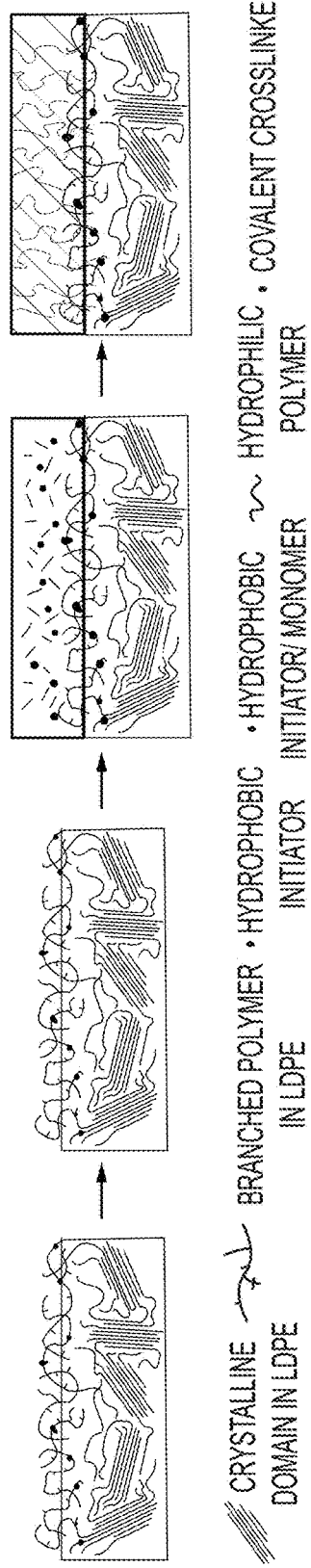
FIG. 9A is a schematic illustration of the fabrication and chemical synthesis of an LDPE-PAAm film.
Figure 9C:
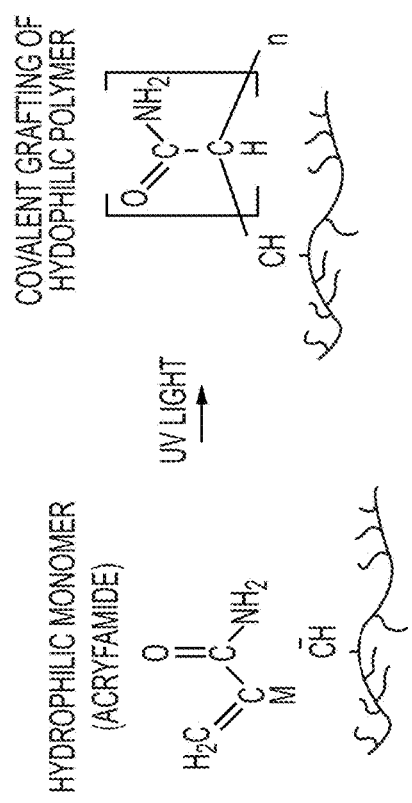
FIG. 9C is a schematic illustration of ultraviolet irradiation of a hydrophilic monomer of the LDPE film of FIG. 9B.
Figure 9B:
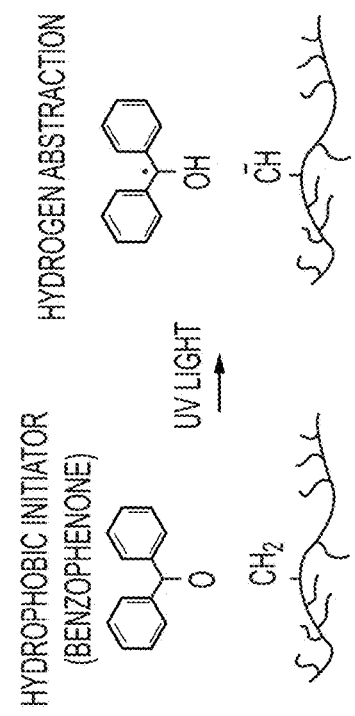
FIG. 9B is a schematic illustration of ultraviolet irradiation of a hydrophobic initiator of an LDPE film.

Fabrication of LDPE-PAAm. FIGS. 9A-9C schematically illustrate the procedure and benzophenone-induced grafting photopolymerization for fabricating the LDPE-PAAm 122. The pristine low-density polyethylene film (e.g., Saran™ Premium Wrap) was first thoroughly cleaned with ethanol and deionized water, and completely dried with nitrogen gas. Thereafter, the benzophenone solution (approximately 10 wt. % in ethanol) was applied onto the polyethylene film to substantially evenly cover the entire surface for approximately 10 minutes at approximately room temperature. The benzophenone-treated polyethylene film was washed with ethanol three times and completely dried with nitrogen gas. Precursor solution of hydrogel polymers was prepared by mixing aqueous solutions of hydrophilic monomer (e.g., acrylamide) and hydrophilic initiator (e.g., Irgacure-2959, approximately 1 wt. %), which can covalently graft hydrophilic long-chain polymers (e.g., polyacrylamide) onto the surface of the LDPE film. The typical concentration of the hydrophilic monomer can be approximately in the range of about 5 wt. % to about 40 wt. %, which can determine the chain density anchored on the surfaces of polyethylene film. The mixture of the precursor solution was poured onto the benzophenone-treated polyethylene film in an acrylic mold and then covered by a glass plate with a hydrophobic coating. Both the precursor solution and the benzophenone-treated polyethylene film were subjected to ultraviolet irradiation in an ultraviolet chamber (e.g., approximately 365 nm ultraviolet; UVP CL-1000), as shown in FIGS. 9B and 9C, for example, for approximately an hour. Under UV radiation, the hydrophilic monomer can form PAAm polymers via free radical polymerization. During the ultraviolet irradiation, the hydrophobic initiator (i.e., benzophenone) can induce the abstraction of a hydrogen atom from the side-chains of branched polymers of the LDPE film 120, consequently initiating the covalent crosslinking between the acrylamide monomers and the side chains of LDPE. Meanwhile, the hydrophilic initiator (i.e., Irgacure-2959) can induce the free-radical polymerization to form long-chain hydrophilic polymers (i.e., polyacrylamide) and surface absorbed benzophenone can mediate the grafting of PAAm polymers onto the reactive sites on the polyethylene chains. After UV radiation, the treated polyethylene film can be thoroughly rinsed with deionized water, for instance to remove the unreacted reagents on the surface of the LDPE film.

Fabrication of SAT. A pristine LDPE film 120 was first pre-stretched and tightly attached to an acrylate plate with no surface wrinkles, as discussed with respect to FIG. 1C above. Thereafter, the pre-stretched LDPE film was uniformly coated with a PDMS solution, using, by way of example, a spin coater (e.g., Specialty coating systems, 6800 Spin Coater Series) with a rotation speed of approximately 250 rpm for approximately three (3) minutes. The thickness of the PDMS layer 108 can be tuned, for example, by adjusting the rotational speed. The mixing ratio of PDMS can be set as 1/30 for the reversible adhesion. The entire sample was further cured at a mild temperature (e.g., 50° C.) for approximately 12 hours to ensure limited or no surface wrinkles formed by the thermal-induced deformation of the LDPE film 120. Once the PDMS layer is cured, the same protocol of synthesizing LDPE-PAAm to covalently graft uncrosslinked PAAm on the other surface of the LDPE film can be followed. The resultant SAT 100 includes a laminated structure with the LDPE film 104 as the intermediate layer, the PDMS as the adhesive layer 108, and the PAAm as the anti-fogging layer 106.

AFM imaging. AFM topology images were acquired with an atomic force microscope (e.g., MFP-3D, Asylum Research). Dry freestanding pristine LDPE and SAT films were directly attached onto the sample stage with a double-sided carbon tape. Surface topology was evaluated for areas covering approximately 10×10 $\mu m^2$.

Confocal microscopy imaging. Due to the optical transparency of the SAT film, different dyes were utilized to facilitate imaging and characterization of the SAT film. A hydrophobic Nile red dye ($\lambda_{emission} \approx 600$ nm) was added to Sylgard 184 mixture to allow the visualization of the PDMS layer while the anti-fogging tape was immersed in an aqueous NHS-fluorescein solution ($k_{emission} \approx 518$ nm) to enable the visualization of the PAAm layer 106.

Contact angle measurement. A total volume of approximately 10 µL deionized water was deposited on both dry and hydrated surfaces of the pristine LDPE film 120 and the PAAm layer 106 of the anti-fogging tape 100. Videos were recorded to measure the advancing and receding contact angles.

UV-vis-NIR measurement. The UV-vis-NIR measurement was conducted by the Cary 5000 UV-vis-NIR spectrophotometer (Agilent Technologies), following the standard ASTM D1003. The first test was run with no specimen in position but with a standard high-reflectance reference material in position to measure the intensity of incident light $T_1$. The second test was run with both specimen and the reference in position to measure the total light transmitted through the specimen $T_2$. The total transmittance can be calculated by the ratio of $T_2$ over $T_1$ (e.g., $T_t = T_2/T_1$). The third test was run with no specimen in position but with a light trap in position to measure the light scattered by the instrument $T_3$. The last test was run with both specimen and light trap in position to measure the light scattered by the instrument and the specimen $T_4$. The diffuse transmittance can be calculated by $T_d = [T_4 - T_3(T_2/T_1)]/T_1$.

Simulation of the total transmittance of the films after condensation. The wave optics simulation of an LDPE-PAAm 122 can be performed by the transfer matrix method, as shown in FIGS. 3A-3G above. The incident light is normally incident on the structure from the LDPE film side and can be assumed unpolarized because, in the present instance, the primary interest is in solar radiation as well as ambient light. The optical properties of water can be taken from the work. The optical properties of LDPE reported in the literature can be used for wavelengths approximately in the range of about 1.1 µm to about 2.5 µm, and the complex refractive index at the shortest wavelength reported in the literature, i.e., $\lambda = 1.1$ µm, can be extrapolated to the shorter wavelengths. To take into account the exponential increase of the absorption coefficient of LDPE in the UV range, their optical properties at the UV range ($\lambda \leq 0.17$ µm) reported in the literature can be approximated as $k = 8.54 \times 10^{-10} \exp(1.55 \times 10^{-15} \omega)$ and can be smoothly connected to those at the visible range. To suppress the oscillation of transmittance due to the nature of perfectly coherent wave optics, the total transmittance with 0.1 nm intervals can be calculated and the average over adjacent points over ±25 nm can be taken. The water thickness of approximately 16 µm can be selected so that the predicted total transmittance best agrees with experimental measurements.

To model the total transmittance through untreated LDPE film 120 with water droplets, the ray optics simulation can be done by using the commercial software COMSOL Multiphysics®. The same LDPE film thickness as that of treated LDPE film, and uniform radius of water droplets, can be assumed. Other geometrical parameters of the system can include the diameter, contact angle, and areal density of water droplets. The diameter of the water droplets can be set to be 80 which approximately is the peak position of the radial distribution, and the contact angle of 110° can be assumed. The areal density can be treated as a fitting parameter and the best fit to experimentally measure total transmittance at approximately 50° C. can be produced when 0.55 is assumed.

Antifogging on stretchable and foldable transparent materials. To demonstrate the capability of eliminating fog on a stretchable transparent material, a Sylgard 184 was thermally cured with a mixture ratio of approximately 10:1 to fabricate a stretchable transparent material, and then the anti-fogging tape was pre-stretched and gently attached on the surface of the PDMS substrate. The surface of the PDMS substrate can be exposed with the anti-fogging tape of the present disclosure to heated water vapor (e.g., 60° C.) to test its anti-fogging property. To demonstrate the capability of eliminating fog on a foldable transparent material, a PET film can be cut to a 2D shape that can be folded into a 3D cube. The anti-fogging tape of the present disclosure can be pre-stretched and gently attached on the surface of the PET film. The 2D PET film can folded, for example, into a 3D cube with the anti-fogging tape as its inner surface. The inner surface of the 3D cube can be exposed to heated water vapor (e.g., 60° C.) to test its anti-fogging property.

One skilled in the art will appreciate further features and advantages of the disclosures based on the provided for descriptions and embodiments. Accordingly, the inventions are not to be limited by what has been particularly shown and described. All publications and references cited herein are expressly incorporated herein by reference in their entirety.

Some non-limiting claims are provided below:

What is claimed is:

1. An anti-fog tape configured to be applied to a transparent object, comprising:
    a first, hydrophilic layer that is configured to have water condensate form a predominantly continuous film thereon in response to a high humidity environment;
    a second, stretchable layer having an elastic recovery of at least about 0.50, the second, stretchable layer being covalently crosslinked with the first, hydrophilic layer; and
    a third, adhesive layer,
    wherein a diffuse transmittance of the anti-fog tape is approximately 5% or less in high-humidity environments.

2. The anti-fog tape of claim 1, wherein the third, adhesive layer is configured to be reversibly adhesive.

3. The anti-fog tape of claim 1, wherein the first, hydrophilic layer is in a swollen state.

4. The anti-fog tape of claim 1, wherein a receding contact angle of the second, stretchable layer is approximately about 0°.

5. The anti-fog tape of claim 1, wherein the anti-fog tape is devoid of each of an anti-fog spray, and one or more hydrophilic spray agents.

6. The anti-fog tape of claim 1, wherein the second, stretchable layer comprises a low-density polyethylene.

7. The anti-fog tape of claim 1, wherein the first, hydrophilic layer comprises uncrosslinked hydrophilic polymers.

8. The anti-fog tape of claim 7, wherein the uncrosslinked hydrophilic polymers of the first, hydrophilic layer comprises uncrosslinked polyacrylamide that is covalently grafted to the first layer.

9. The anti-fog tape of claim 7, wherein the uncrosslinked hydrophilic polymers provide the covalent crosslink between the second, stretchable layer and the first, hydrophilic layer.

10. The anti-fog tape of claim 1, wherein the third, adhesive layer comprises crosslinked polydimethylsiloxane.

11. The anti-fog tape of claim 1, wherein the diffuse transmittance of approximately 5% or less is maintained under at least one of uniaxial tension, punching, or cyclic scratching.

12. The anti-fog tape of claim 1, wherein a total transmittance of the anti-fog tape is approximately at least 80%.

13. The anti-fog tape of claim 12, wherein the total transmittance of approximately at least 80% is maintained under at least one of uniaxial tension, punching, or cyclic scratching.

14. The anti-fog tape of claim 12, wherein the total transmittance of approximately at least 80% and the diffuse transmittance of approximately 5% or less is maintained for at least 50 days.

15. An object having the anti-fog tape of claim 1 coupled thereto, the object being a flat object or a curved object.

16. An anti-fog tape configured to be applied to a transparent object, comprising:
    a first, hydrophilic layer that is configured to have water condensate form a predominantly continuous film thereon in response to a high humidity environment;
    a second, stretchable layer having an elastic recovery of at least about 0.50; and
    a third, adhesive layer,
    wherein a diffuse transmittance of the anti-fog tape is approximately 5% or less in high-humidity environments, and
    wherein a receding contact angle of the second, stretchable layer is approximately about 0°.

17. The anti-fog tape of claim 16, wherein the first, hydrophilic layer comprises uncrosslinked hydrophilic polymers.

18. The anti-fog tape of claim 17, wherein the uncrosslinked hydrophilic polymers of the first, hydrophilic layer comprises uncrosslinked polyacrylamide that is covalently grafted to the first layer.

19. The anti-fog tape of claim 17, wherein the uncrosslinked hydrophilic polymers provide the covalent crosslink between the second, stretchable layer and the first, hydrophilic layer.

20. An anti-fog tape configured to be applied to a transparent object, comprising:
    a first, hydrophilic layer that comprises uncrosslinked polyacrylamide that is covalently grafted to the first layer and is configured to have water condensate form a predominantly continuous film thereon in response to a high humidity environment;
    a second, stretchable layer having an elastic recovery of at least about 0.50; and
    a third, adhesive layer, wherein a diffuse transmittance of the anti-fog tape is approximately 5% or less in high-humidity environments.

* * * * *